United States Patent [19]

Miyazawa

[11] Patent Number: 5,596,255
[45] Date of Patent: Jan. 21, 1997

[54] METHOD OF AND APPARATUS FOR GUIDING MICROROBOT

[75] Inventor: Osamu Miyazawa, Suwa, Japan

[73] Assignee: Seiko Epson Corporation, Tokyo-to, Japan

[21] Appl. No.: 324,935

[22] Filed: Oct. 18, 1994

Related U.S. Application Data

[63] Continuation-in-part of Ser. No. 70,399, Jun. 7, 1993.

[30] Foreign Application Priority Data

Oct. 19, 1993 [JP] Japan .................................. 5-260830
Aug. 26, 1994 [JP] Japan .................................. 6-202358

[51] Int. Cl.⁶ .................................................. B25J 5/00
[52] U.S. Cl. .............................. 318/568.12; 364/424.02; 395/93; 395/94; 901/1
[58] Field of Search ........................... 318/568.12, 567, 318/567.11–.24, 580, 586, 577; 364/424.01, 424.02; 395/80–99, 901; 901/1

[56] References Cited

U.S. PATENT DOCUMENTS

| | | | |
|---|---|---|---|
| 3,970,840 | 7/1976 | DeBruine | 318/577 X |
| 4,279,563 | 7/1981 | Miller . | |
| 4,306,329 | 12/1981 | Yokoi . | |
| 4,638,445 | 1/1987 | Mattaboni | 364/513 |
| 4,736,116 | 4/1988 | Pavlak, Jr. et al. | 307/41 |
| 4,736,826 | 4/1988 | White et al. . | |
| 4,746,977 | 5/1988 | White . | |
| 4,777,416 | 10/1988 | George, II et al. . | |
| 4,817,653 | 4/1989 | Krajicek et al. . | |
| 4,829,442 | 9/1989 | Kadanoff et al. . | |
| 4,907,169 | 3/1990 | Lovoi | 318/577 X |
| 4,967,862 | 11/1990 | Pong et al. . | |
| 5,001,635 | 3/1991 | Yasutomo et al. . | |
| 5,049,802 | 9/1991 | Mintus et al. . | |
| 5,083,073 | 1/1992 | Kato | 318/573 X |
| 5,109,566 | 5/1992 | Kobayashi et al. . | |
| 5,204,814 | 4/1993 | Noonan et al. . | |
| 5,284,522 | 2/1994 | Kobayashi et al. . | |
| 5,297,917 | 3/1994 | Freneix . | |
| 5,301,096 | 4/1994 | Klontz et al. . | |
| 5,304,899 | 4/1994 | Sasaki et al. | 318/16 |

FOREIGN PATENT DOCUMENTS

| | | |
|---|---|---|
| 57-199007 | 12/1982 | Japan . |
| 61-234408 | 10/1986 | Japan . |
| 61-262815 | 11/1986 | Japan . |
| 61-262814 | 11/1986 | Japan . |
| 2-219111 | 8/1990 | Japan . |
| 2-231608 | 9/1990 | Japan . |
| 3-264365 | 11/1991 | Japan . |
| 4-316105 | 11/1992 | Japan . |
| 1259720 | 1/1972 | United Kingdom . |
| 2166315 | 4/1986 | United Kingdom . |
| 2182634 | 5/1987 | United Kingdom . |

*Primary Examiner*—David S. Martin
*Attorney, Agent, or Firm*—Harold T. Tsiang

[57] ABSTRACT

A method of and an apparatus for guiding a microrobot without the necessity of an operator is disclosed. The operation area for the microrobot can easily be enlarged, contracted or changed. Sensors of the microrobot are used to cause the microrobot to react to light, magnetism or sound through an arbitrary passage formed on a surface of a light transmissible base plate, on which the microrobot is moved. The passage is formed by projecting light emitted from a light source through a pattern mask from an opposite side of the base plate.

22 Claims, 16 Drawing Sheets

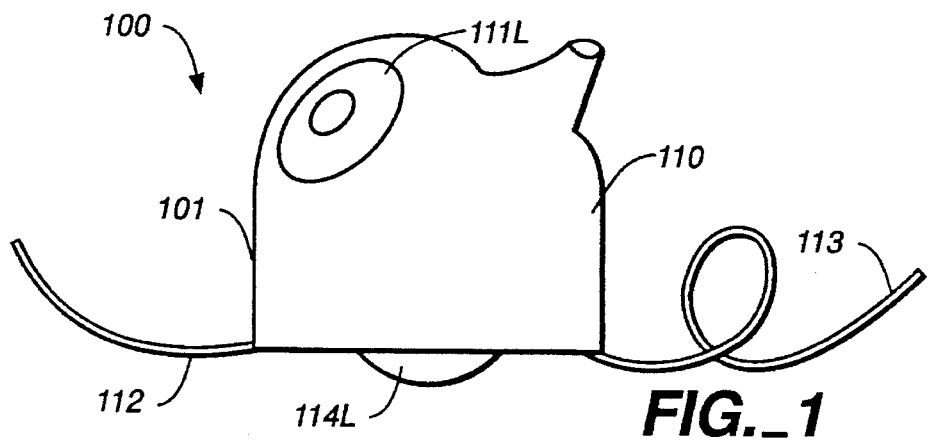
FIG._1
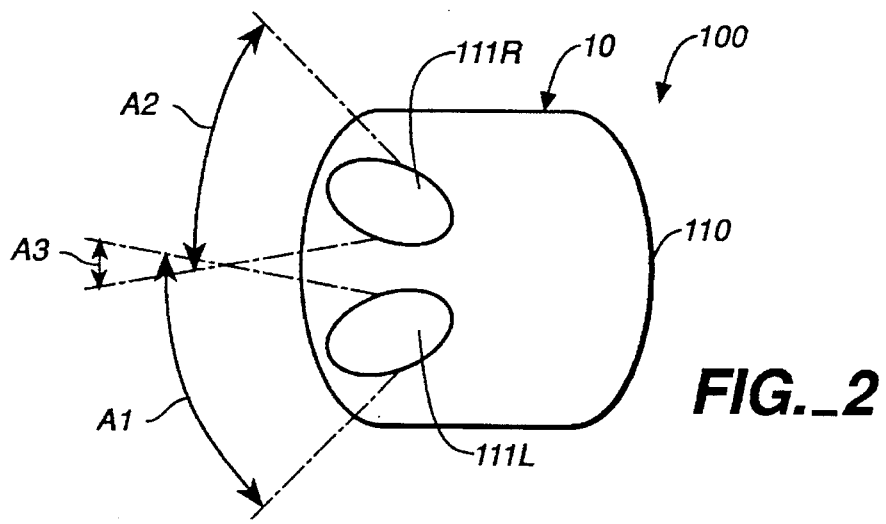
FIG._2
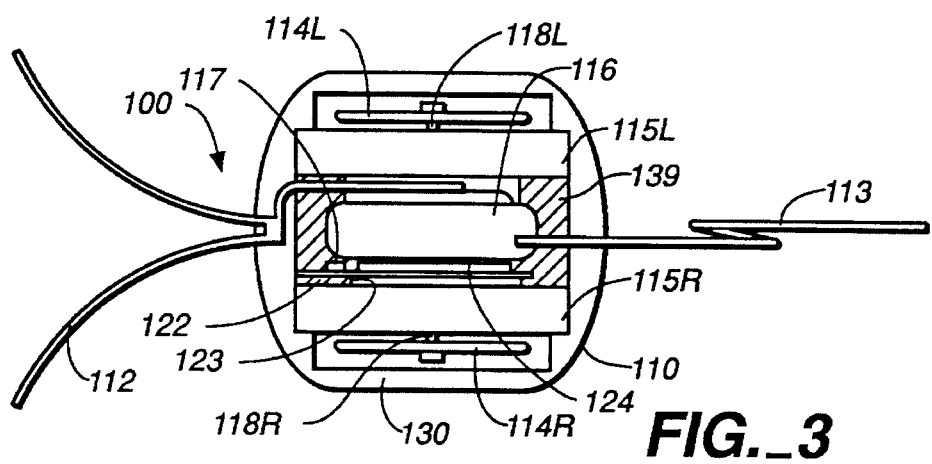
FIG._3

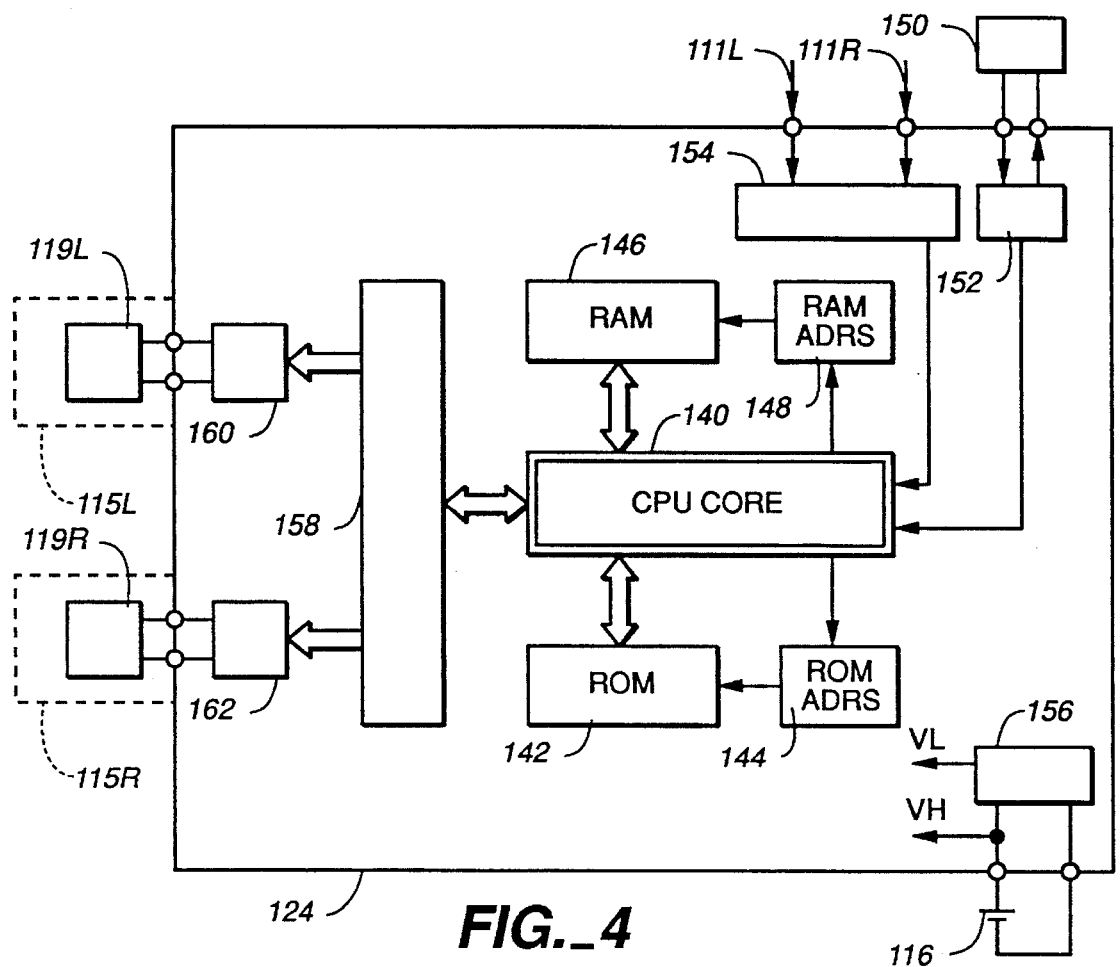
FIG._4
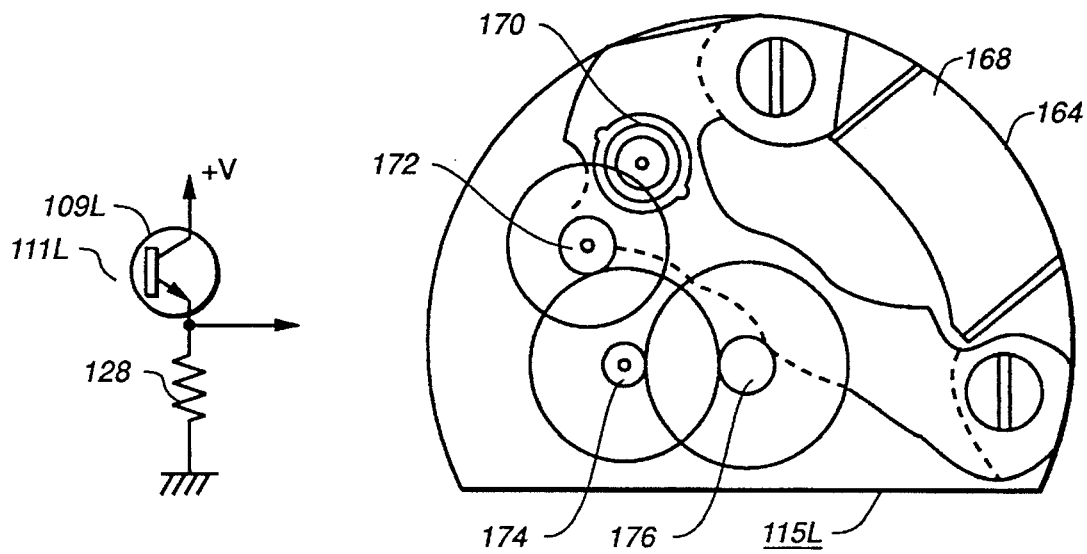
FIG._5　　FIG._6

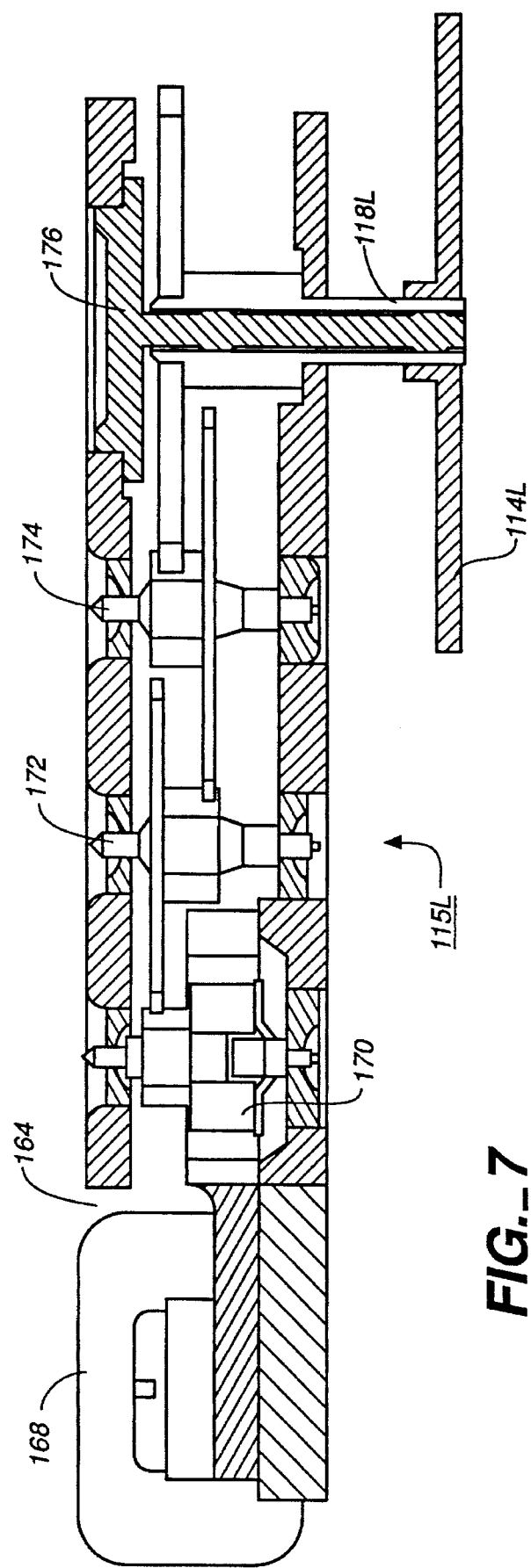
FIG._7

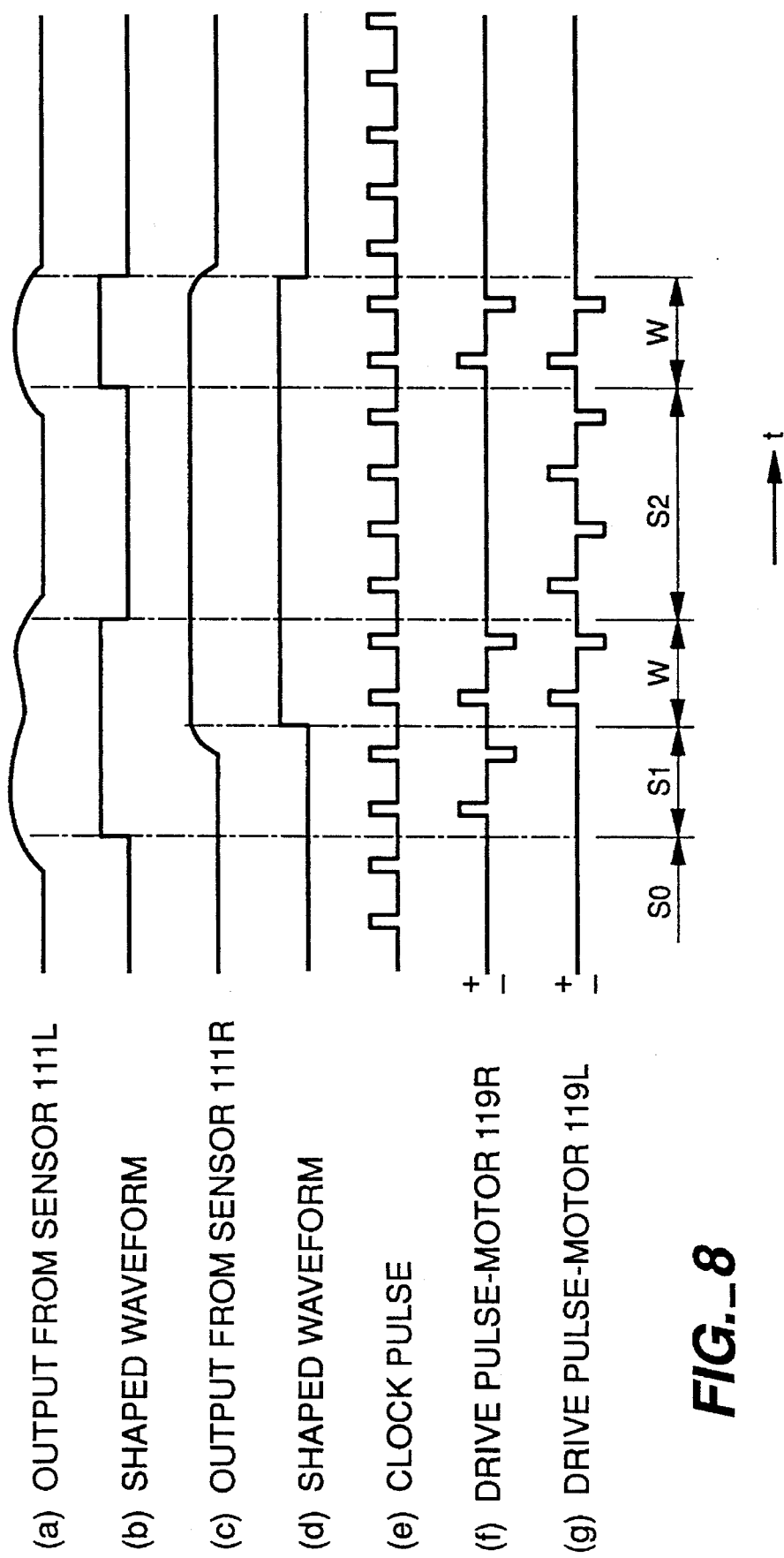
FIG._8

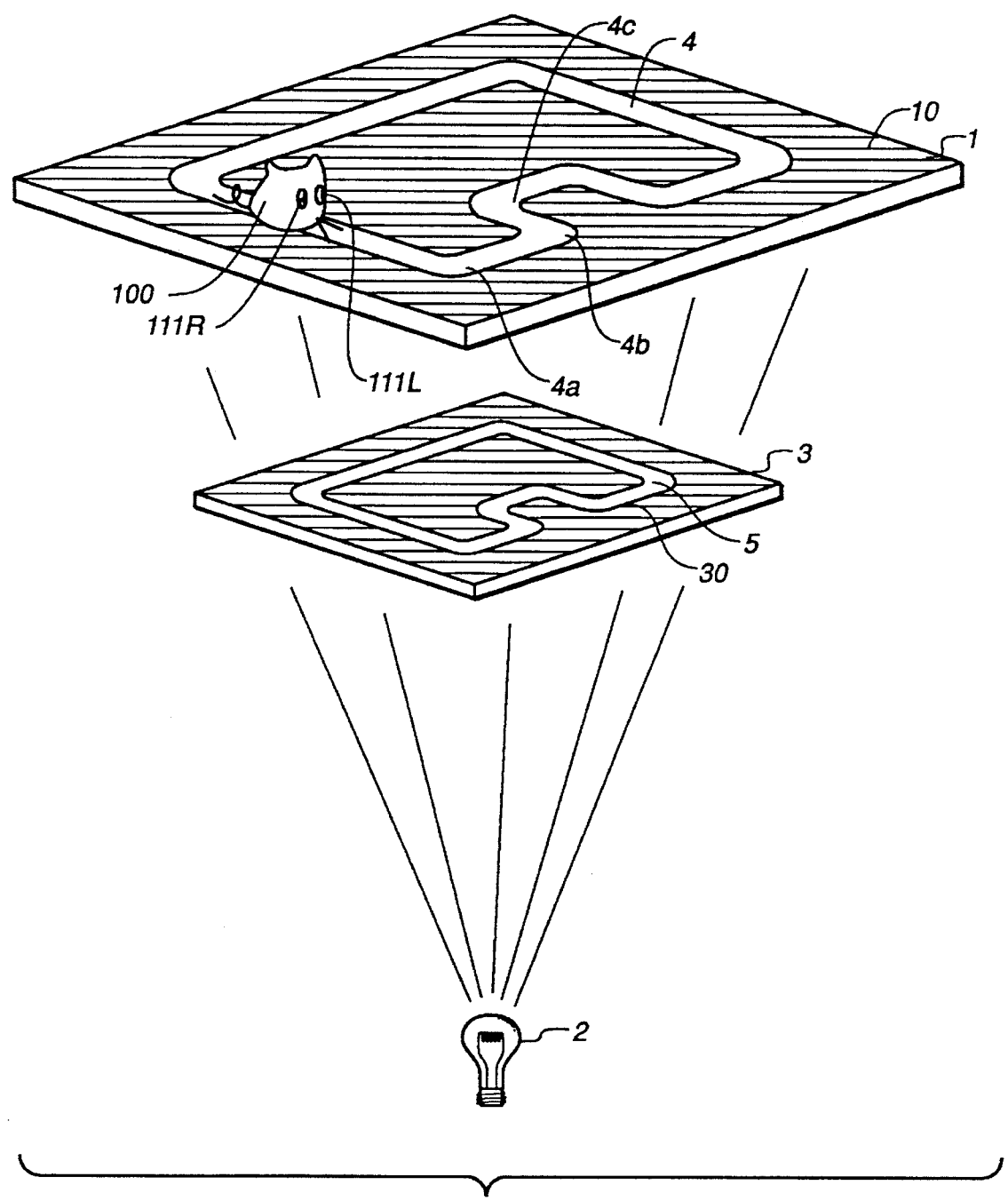
FIG._9

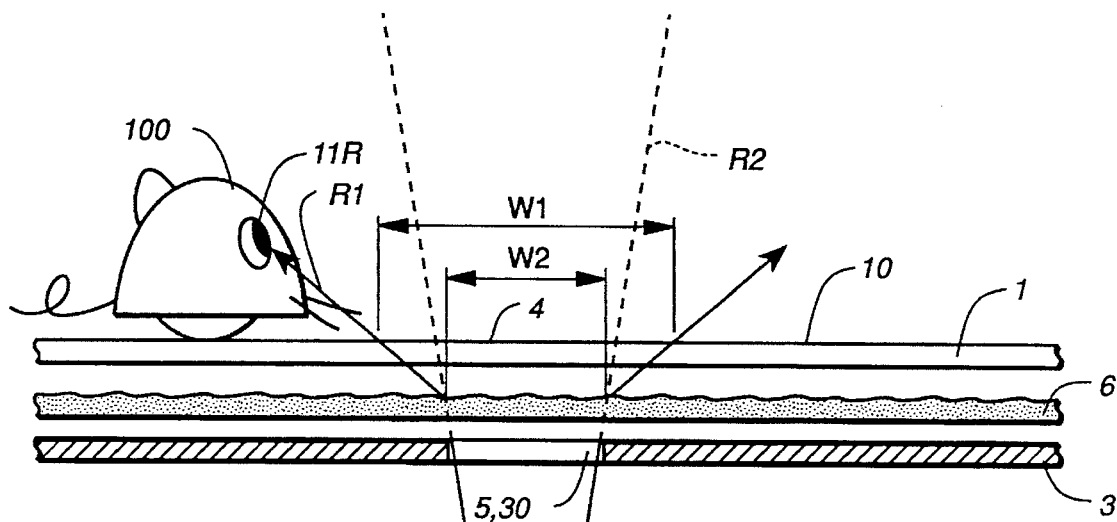
FIG._10
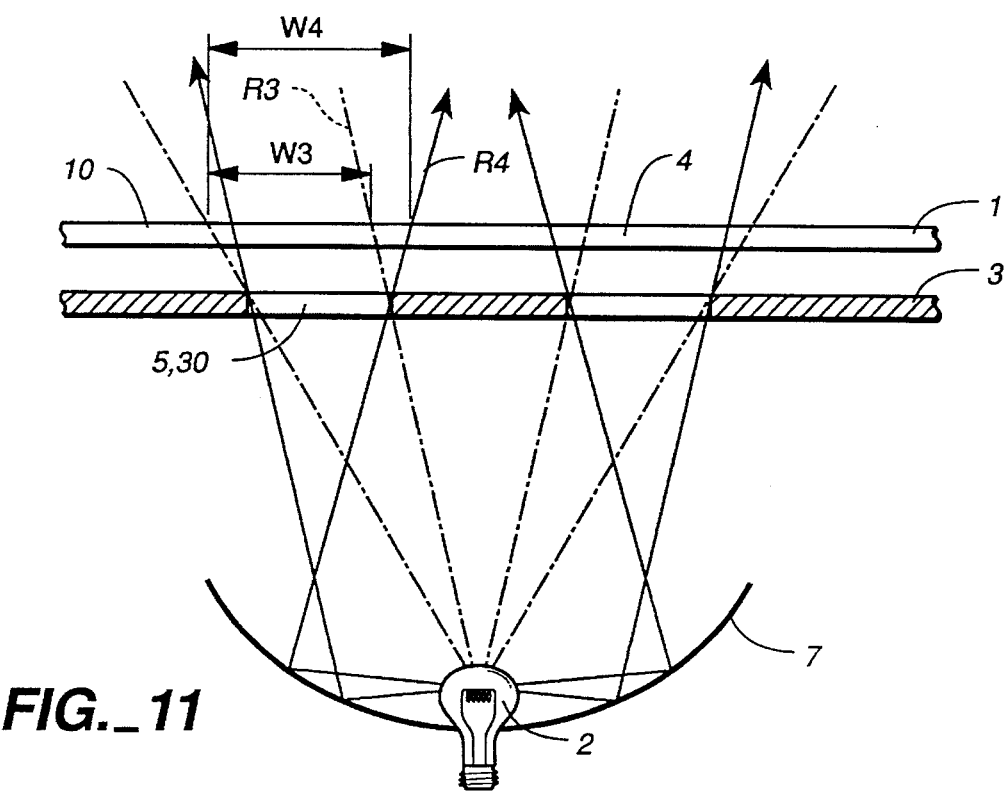
FIG._11

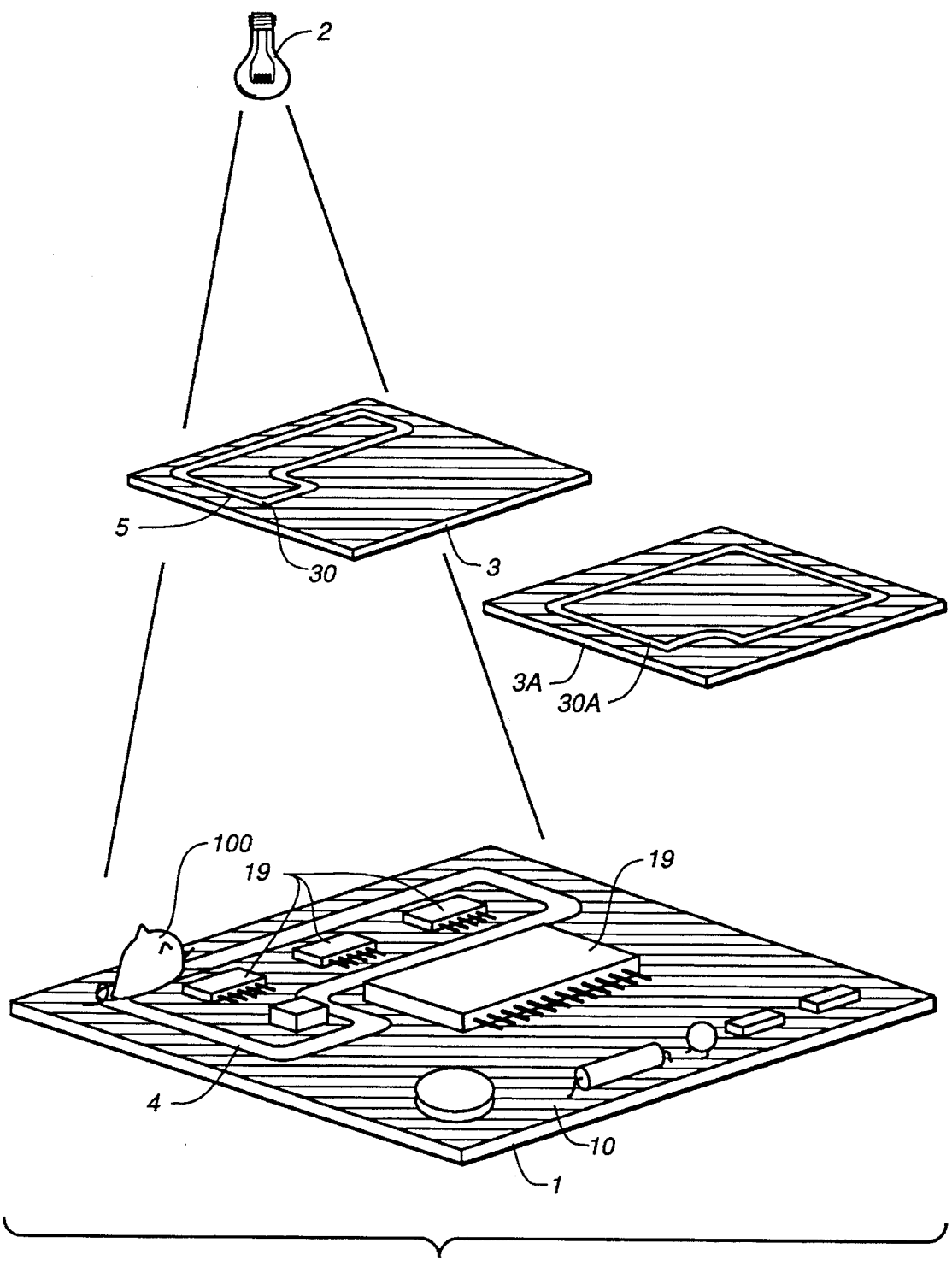
FIG._12

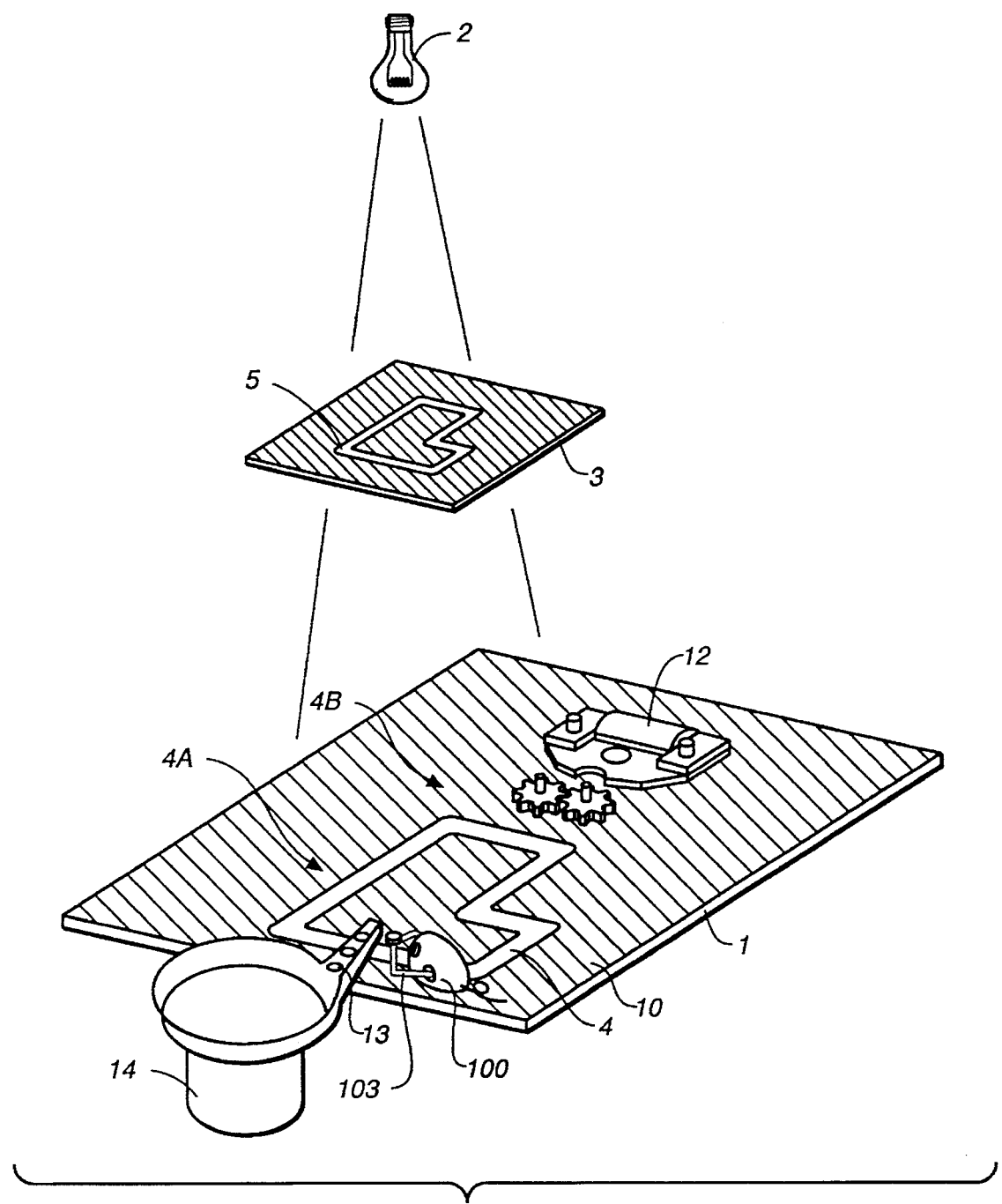
FIG._13

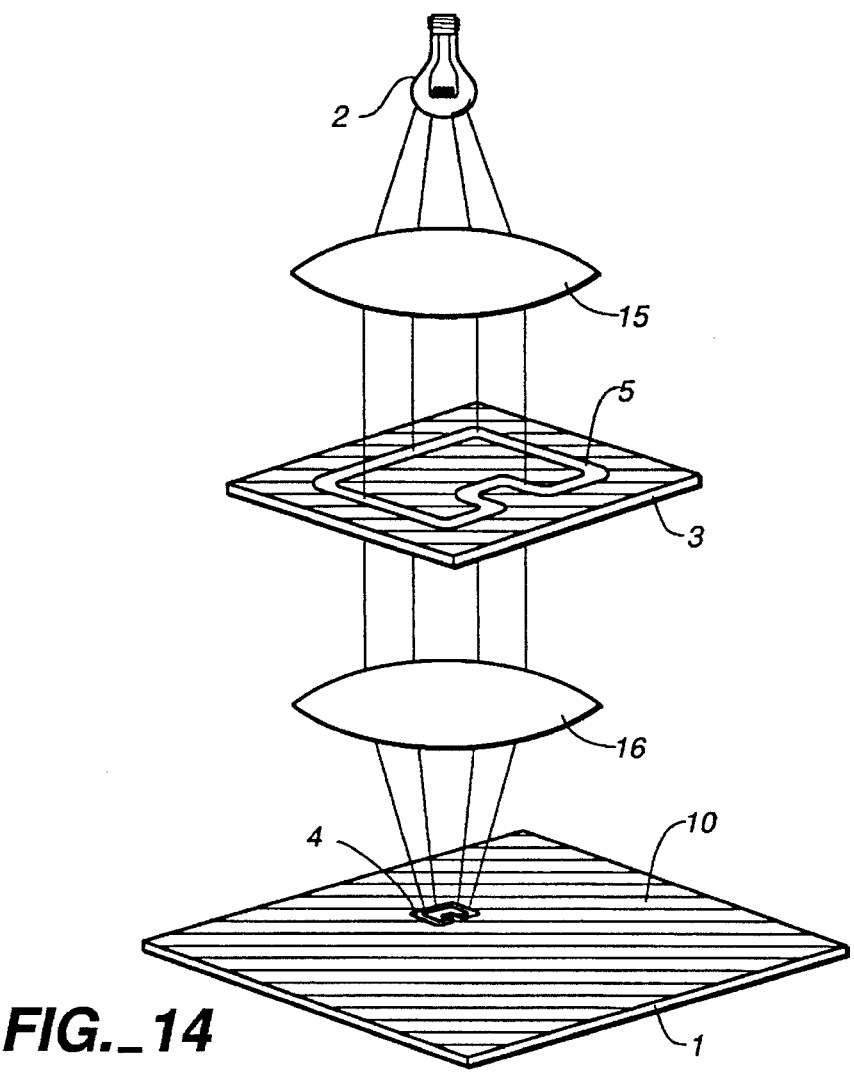
FIG._14
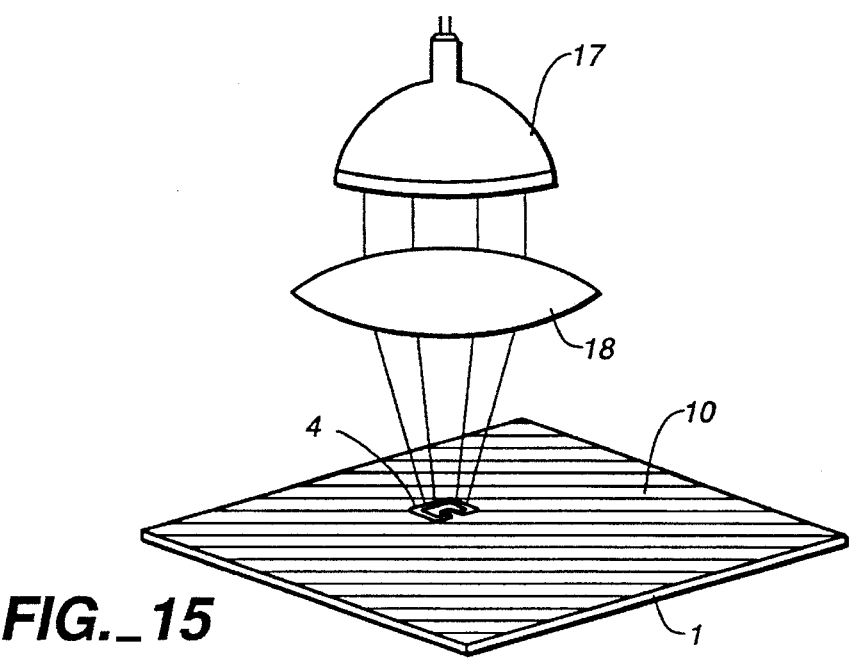
FIG._15

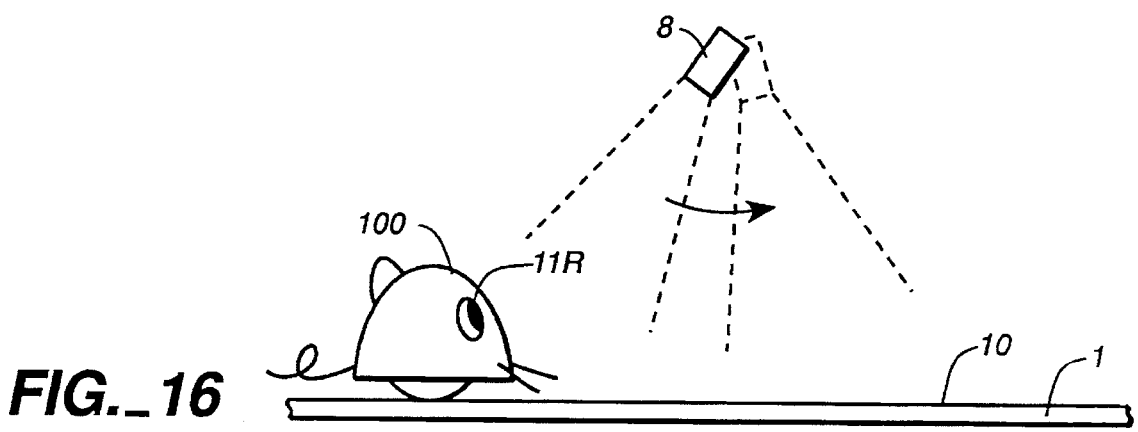
FIG._16
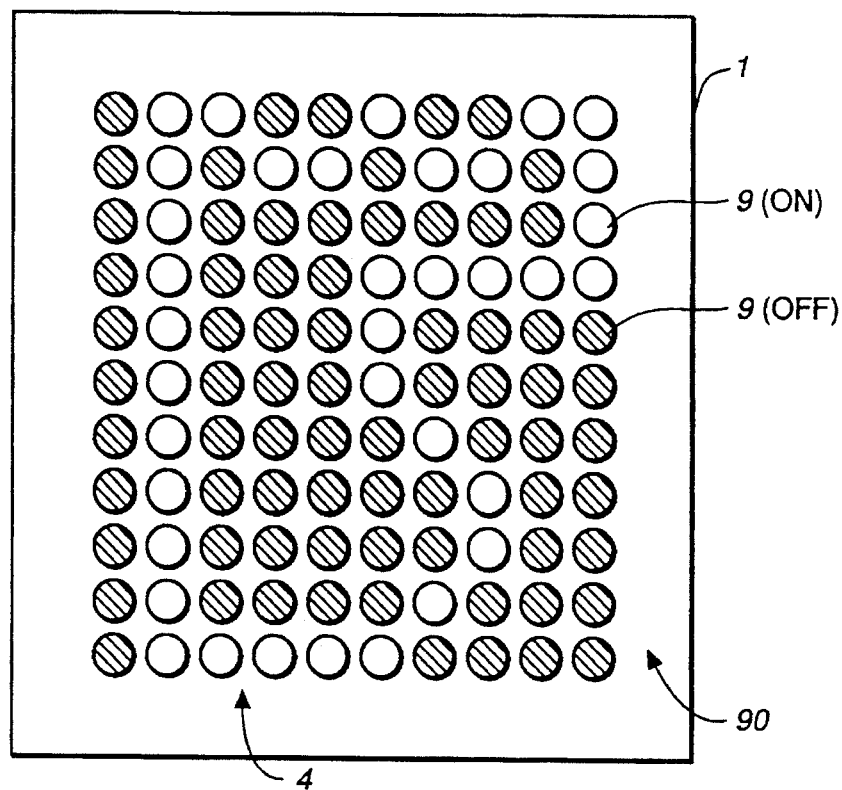
FIG._17
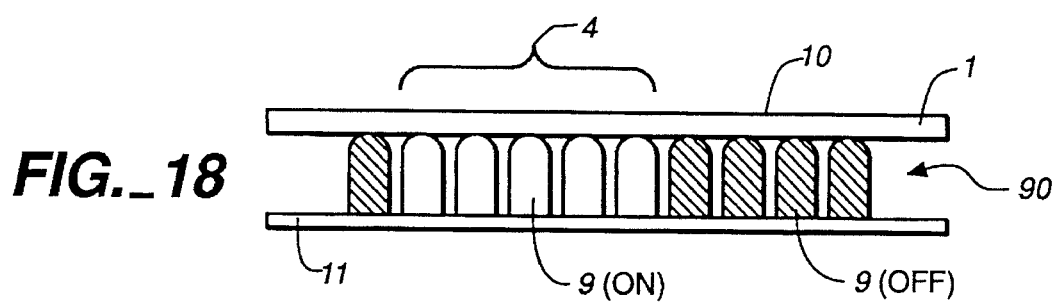
FIG._18

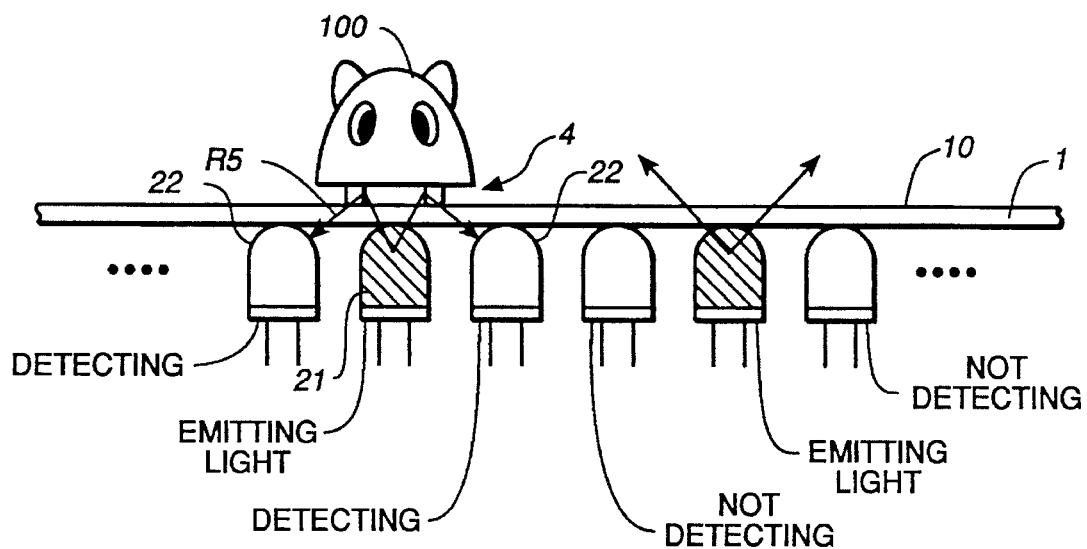
FIG._19
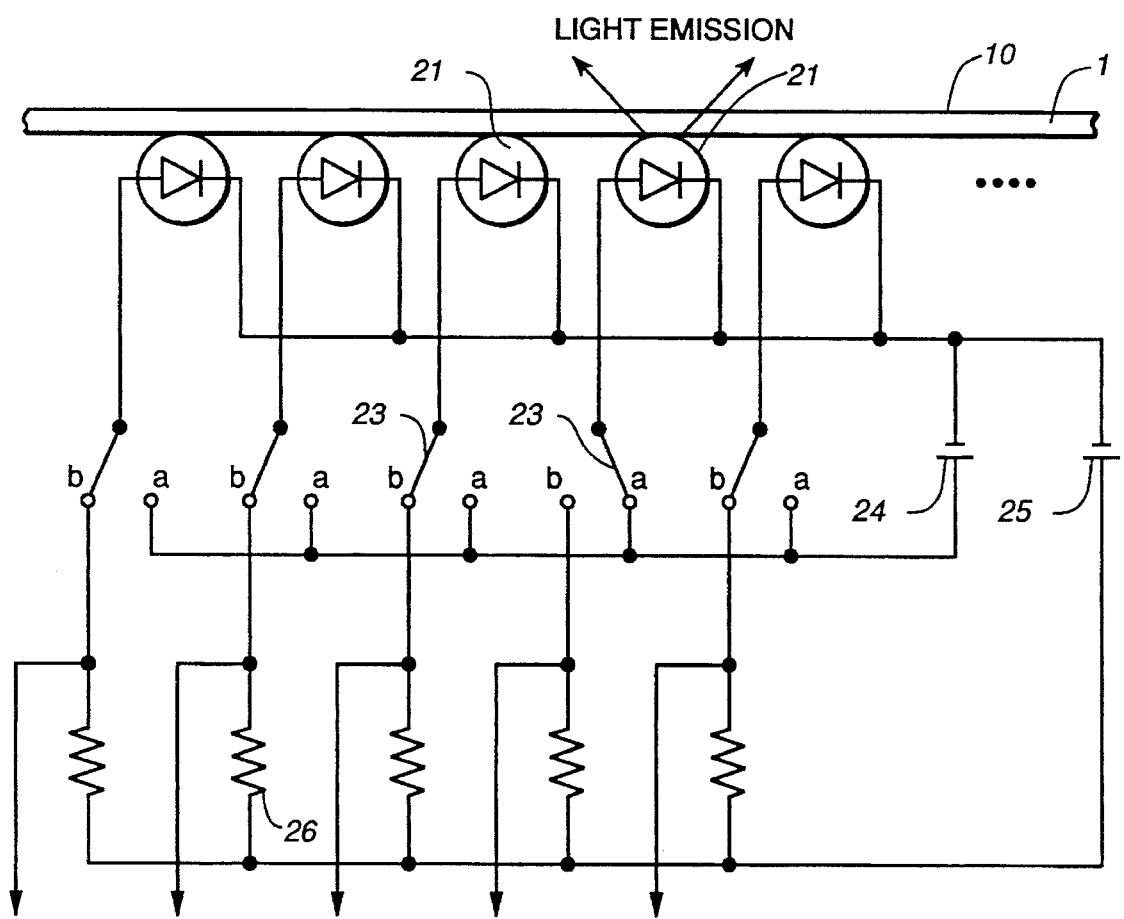
FIG._20

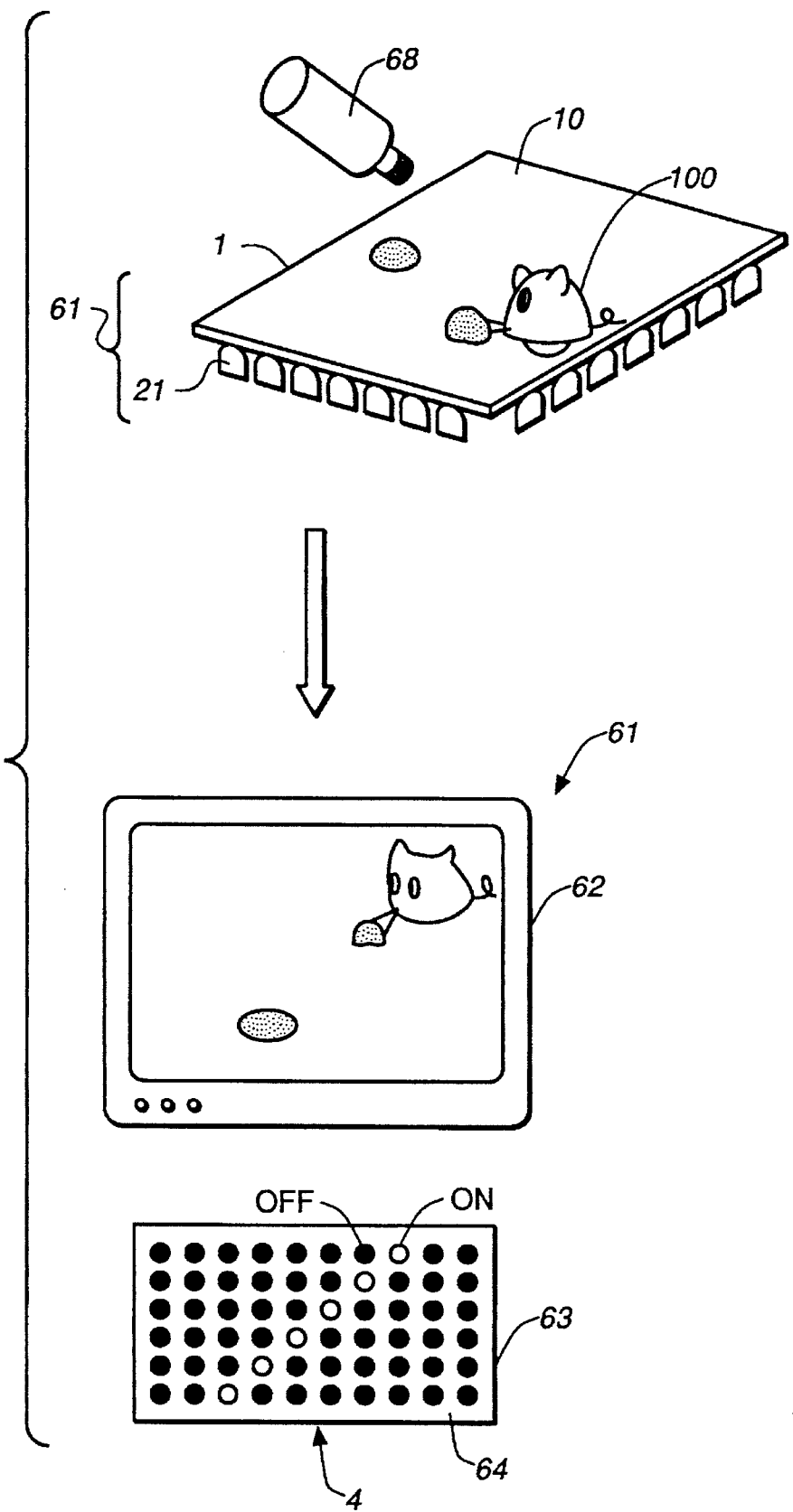
FIG._21

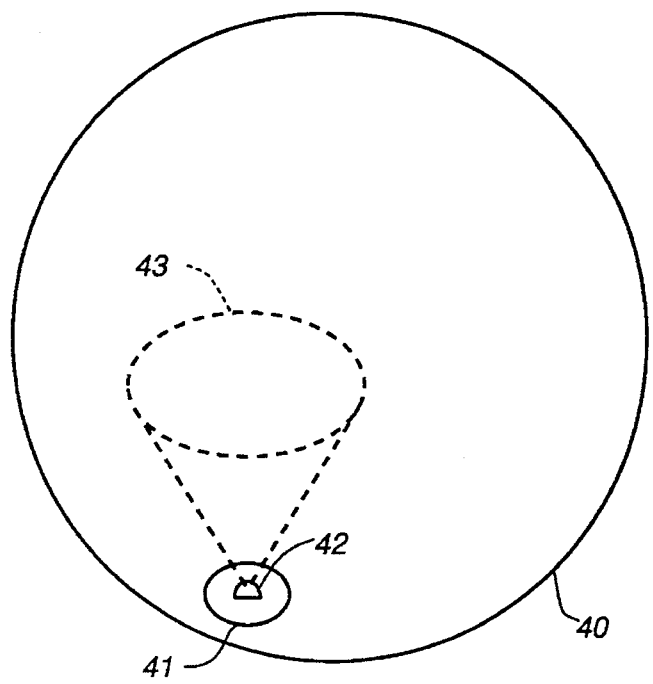
FIG._22
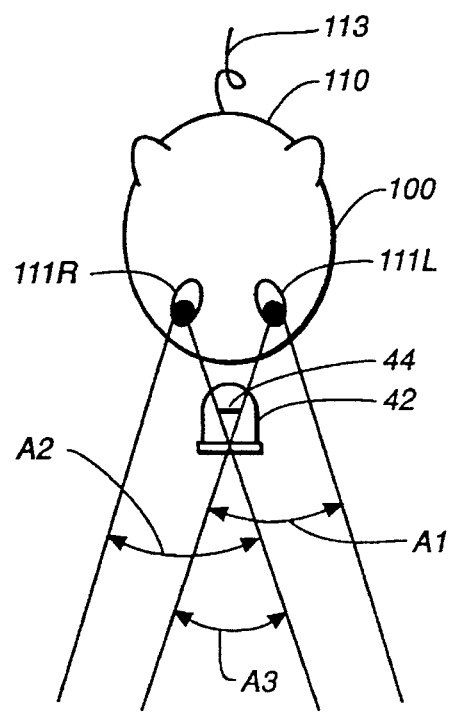
FIG._24
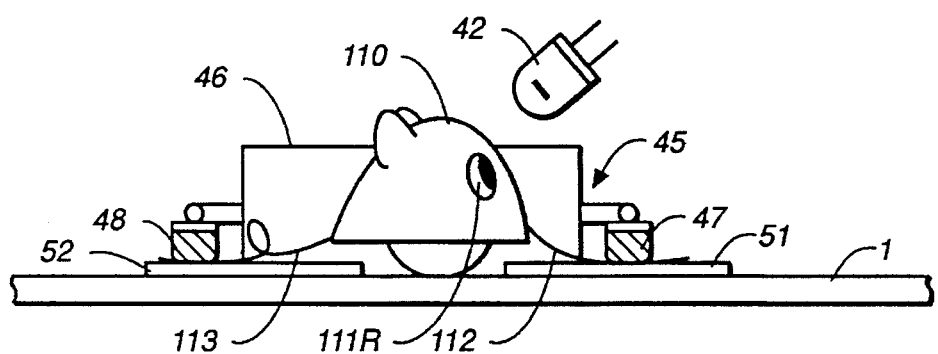
FIG._25

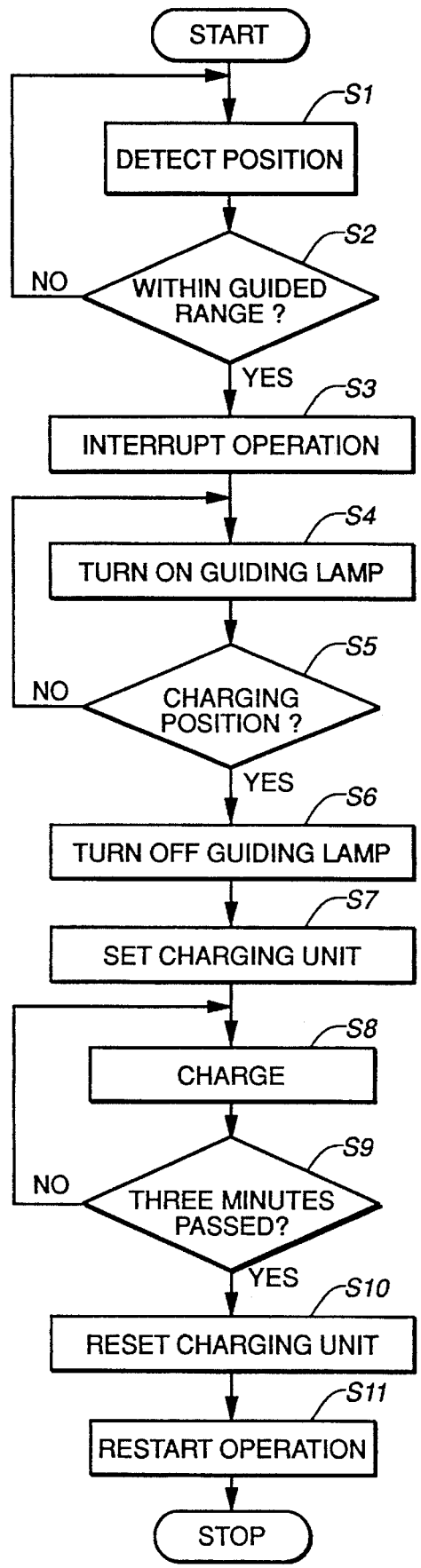
FIG._23

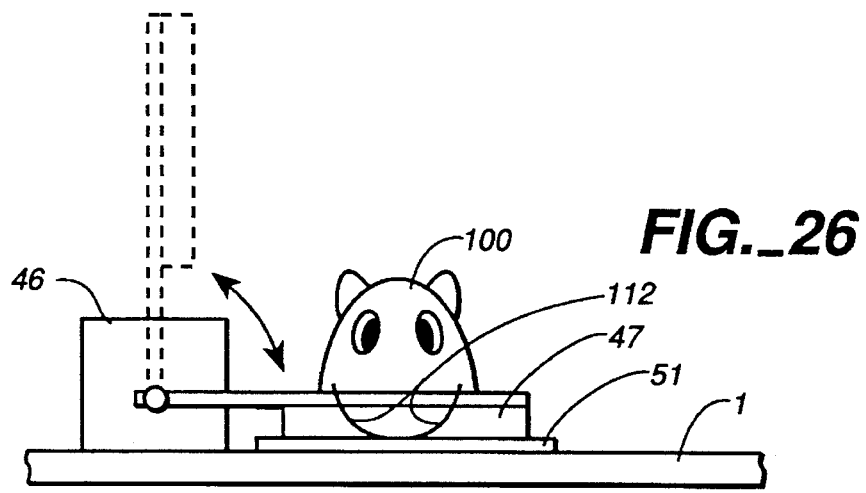
FIG._26
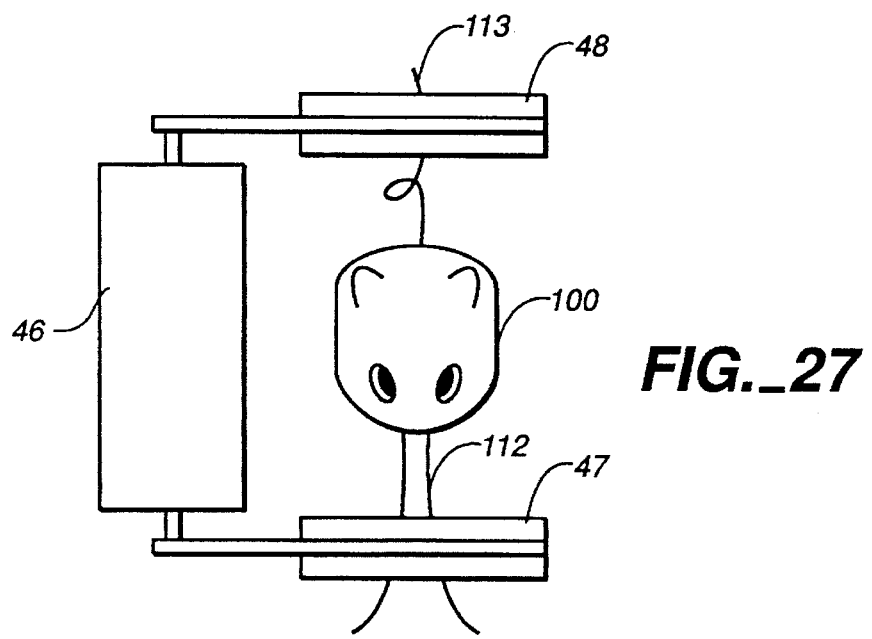
FIG._27
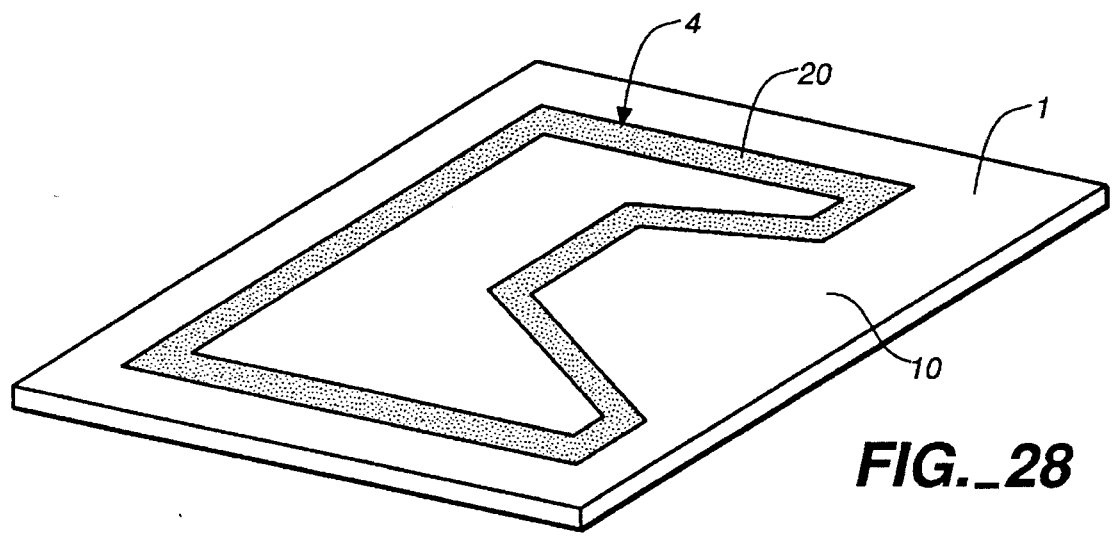
FIG._28

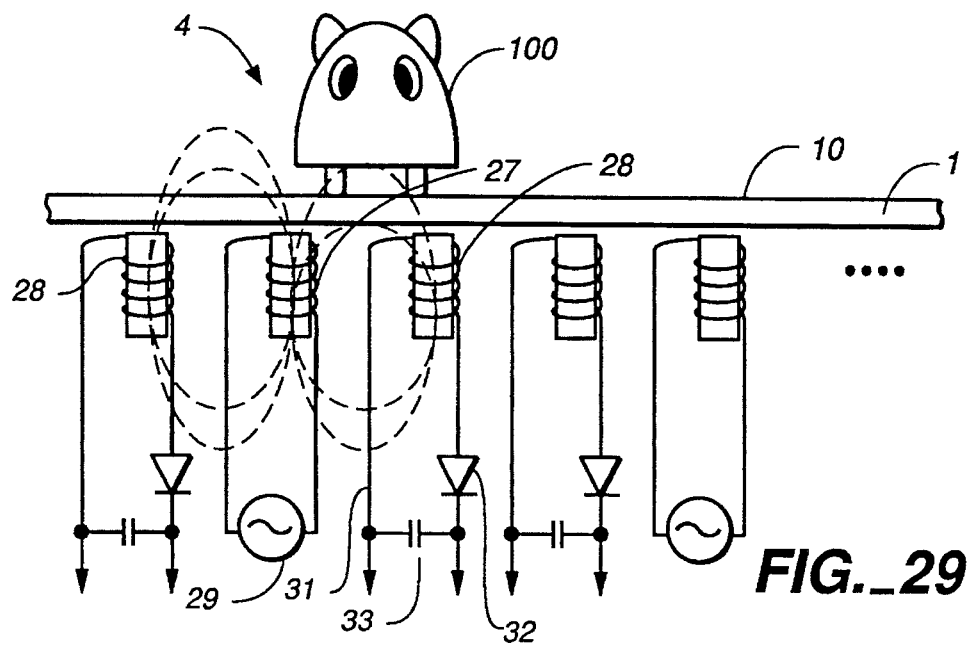
FIG._29
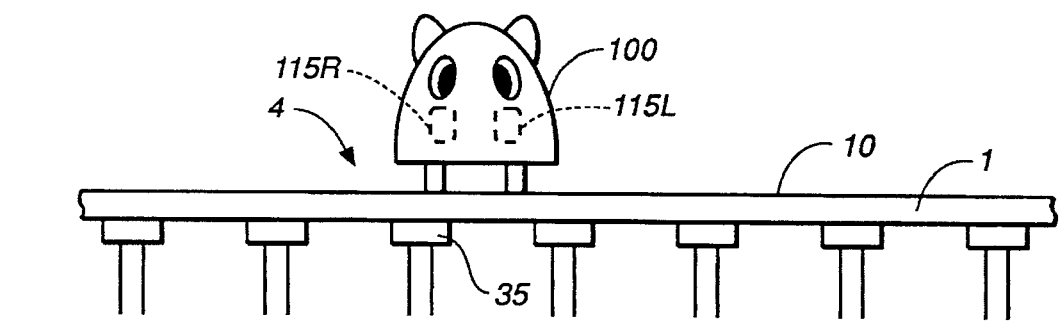
FIG._30
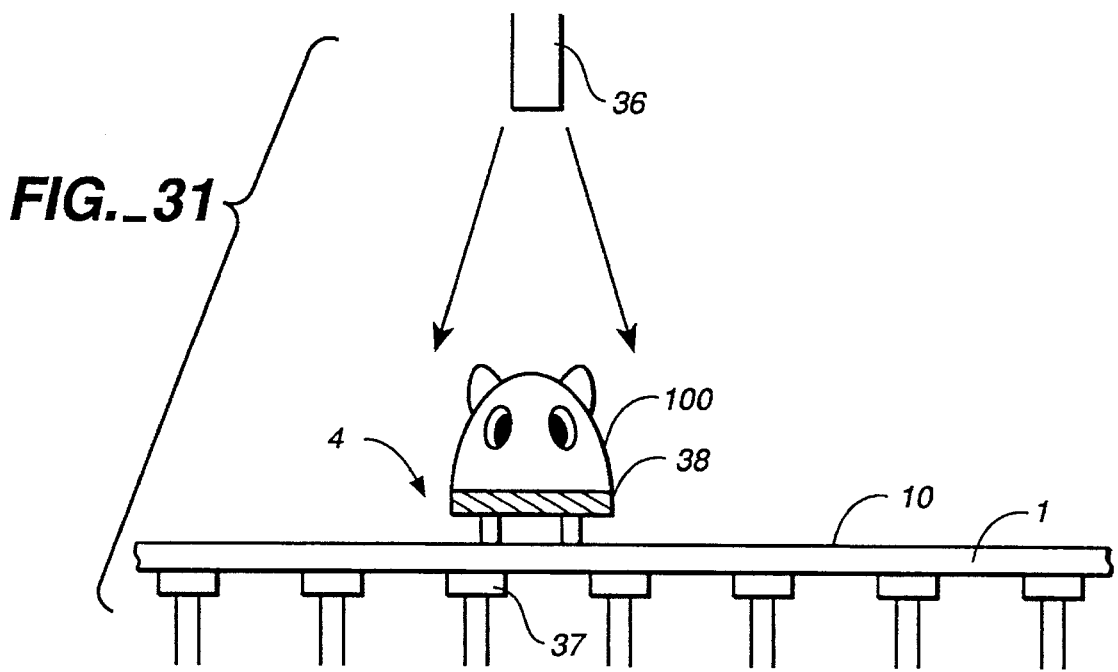
FIG._31

5,596,255

METHOD OF AND APPARATUS FOR GUIDING MICROROBOT

This is a continuation-in-part of the following U.S. application Ser. No. 08/070,399, filed Jun. 7, 1993.

BACKGROUND OF THE INVENTION

The present invention relates to a method of and an apparatus for guiding a mic-o light, magnetism, sound or the like.

The inventor of the present invention has developed a microrobot that moves in response to light, magnetism, sound or the like and has a volume of about 1 cm$^3$ or smaller. The invention uses a conventional technology (see WO/93/09018). Conventionally, the microrobot is guided by a wireless method and therefore an operator must irradiate the sensor or the like of the microrobot with light or the like to guide the microrobot. If moving the microrobot, like moving a living thing, is enjoyed, the guiding operation performed by an operator does not present any problems.

In a case where a microrobot of the above type is used in a certain operation, for example, an operation to be performed in a place into which arms of a usual robot cannot be introduced or operated satisfactorily, e.g., mounting or bonding elements or removing foreign matters, the microrobot must be automatically guided. Therefore, the conventional guiding method requiring the operator's guiding operation cannot be adapted satisfactorily.

The conventional industrial robot or automatic machine having a conventional structure cannot freely turn its moving direction outside a predetermined operation area. Therefore, the operation area cannot easily be enlarged or changed. In particular, a microrobot of the above type cannot easily possess the function of programming the passage or the function of avoiding obstacles from the viewpoint of the technological level and of reducing the cost. Accordingly, a guiding apparatus for automatically guiding the microrobot must be provided separately from the microrobot. However, there has not been disclosed an apparatus for guiding a microrobot of the above type that is capable of freely enlarging and changing the operation area for the microrobot.

SUMMARY OF THE INVENTION

Accordingly, an object of the present invention is to provide a method of and an apparatus for guiding a microrobot that is capable of overcoming the above problems and enabling the operation area for a microrobot to be easily enlarged, changed or contracted in a manner like a diaorama.

Another object of the present invention is to provide a method of and an apparatus for guiding a microrobot that is capable of causing the microrobot to move while the position of the microrobot is monitored.

Another object of the present invention is to provide a method of and an apparatus for guiding a microrobot that is capable of automatically guiding the microrobot to a charging area for the purpose of continuously operating the microrobot.

According to one aspect of the present invention, there is provided a method of guiding a microrobot comprising the steps of forming a pattern of change in a physical quantity on a base plate for defining a surface on which a microrobot having detection means capable of detecting change in one or more physical quantities is moved; and causing the microrobot to move along the pattern.

A guiding apparatus according to the present invention comprises a base plate for defining a surface on which the microrobot moves and passage forming means for forming a pattern of change in a physical quantity as a passage for the microrobot on a surface of the base plate on which the microrobot is moved.

In the present invention, when the passage forming means has formed the change pattern of the physical quantity on the surface of the base plate on which the microrobot is moved, the microrobot moves along the change pattern of the physical quantity while its detection means responds to the intensity of the physical quantity, such as light, magnetism or sound. Therefore, the operator is not required for automatically guiding the microrobot. The passage formed on the surface of the base plate, on which the microrobot is moved, is the change pattern of the physical quantity, such as light, magnetism and sound. Therefore, the pattern can easily be changed and therefore the operation area for the microrobot can freely be enlarged or changed.

According to the present invention, it is preferable that the physical quantity near the surface of the base plate, on which the microrobot is moved, is detected. The microrobot is moved while the position of the microrobot is detected based on the fact that the result of the detection changes depending upon the position of the microrobot. In order to achieve this, a robot position detection means is provided for the guiding apparatus. The robot position detection means is arranged to detect the physical quantity near the surface of the base plate, on which the microrobot is moved, so as to detect the position of the microrobot. If the position of the microrobot can be monitored as described above, it is convenient to cause the microrobot to perform a complicated operation.

It is preferable that the passage for the microrobot includes a charging area in which a charging unit for charging electric power to the microrobot is disposed. This structure enables electric power to be charged into the microrobot without removing the microrobot from the surface of the base plate. Therefore, the microrobot can perform a continuous operation.

According to the present invention, it is preferable that a projecting apparatus be used to project a bright and dark light pattern, which is a physical quantity, on the surface of the base plate, on which the microrobot is moved. The microrobot is caused to move along the bright and dark pattern. A passage forming means is provided with the projecting apparatus for projecting a bright and dark light pattern, which is a physical quantity, on the surface of the base plate, on which the microrobot is moved.

In a case where the bright and dark light pattern is used, it is preferable that robot position detection means be provided to detect the intensity of light near the surface of the base plate, on which the microrobot is moved, so as to detect the position of the microrobot. The result of the detection changes depending upon the position of the microrobot.

In a case where the base plate has light transmissibility, the projecting apparatus is provided with a light source portion for irradiating the base plate with light from the reverse side of the base plate. A pattern mask is disposed between the light source portion and the base plate. This pattern mask includes a light transmissible portion having a predetermined pattern corresponding to the bright and dark pattern. As an alternative to this, the projecting apparatus is provided with a light source portion for irradiating the surface of the base plate, on which the microrobot is moved, from an upper position. A pattern mask is disposed between the light source portion and the base plate and includes a light transmissible portion having a pattern corresponding to the bright and dark pattern.

The base plate according to the present invention has light transmissibility. A group of light emitting members disposed on the reverse side of the base plate is caused to emit light to project a bright and dark light pattern, which is a physical quantity, on the surface of the base plate, on which the microrobot is moved. The microrobot is enabled to move along the bright and dark pattern.

According to the present invention, the passage forming means may be provided with the group of the light emitting members disposed on the reverse side of the base plate and serving as light sources. The passage forming means may also be provided with a light emitting member control means for causing the light emitting member group to emit light in a predetermined pattern.

In the above case, a robot position detection means may be used to detect the position of the microrobot based on the a fact that the electromotive force of a portion of an LED group serving as the light emitting group that is not emitting light changes in response to light reflected by the microrobot. The position of the microrobot can also be detected by a robot position detection means which has light receiving members disposed among the light emitting member group. The robot position detection means also detects the position of the microrobot based on the fact that the intensity of light received by the light receiving members changes in response to light reflected by the microrobot.

In a case where the above bright and dark light pattern is used, it is preferable that the passage forming means be provided with an optical system, such as a light diffusion plate or a reflecting plate, for diverging or converging light emitted from the light source to change the size of the bright and dark light pattern to be projected on the surface of the base plate, on which the microrobot is moved.

The passage forming means may be provided with a light source portion within a predetermined range for irradiating the surface of the base plate, on which the microrobot is moved, with light. A drive mechanism is provided for moving the position, to which light emitted from the light source portion is applied, on the surface of the base plate, on which the microrobot is moved.

According to the present invention, a magnetism generating means may be used to form an intense and weak magnetism pattern, which is a physical quantity, on the surface of the base plate, on which the microrobot is moved, for moving the microrobot along the intense and weak pattern. In this case, the passage forming means may be provided with a magnetic field generating means, such as a sheet magnet, a magnetic film or a magnetic head, for forming an intense and weak magnetism pattern, which is a physical quantity, on the surface of the base plate, on which the microrobot is moved.

In the above case, it is preferable that a robot position detection means be provided which monitors the magnetic flux density near the surface of the base plate, on which the microrobot is moved, so as to detect the position of the microrobot based on the fact that the magnetic flux density changes depending upon the position of the microrobot.

According to the present invention, an ultrasonic wave generating means may be used to form an intense and weak ultrasonic wave pattern, which is a physical quantity, on the surface of the base plate, on which the microrobot is moved, for moving the microrobot along the intense and weak pattern. In this case, the passage forming means may be provided with an ultrasonic wave generating means, such as an ultrasonic wave head, for forming an intense and weak ultrasonic wave pattern, which is a physical quantity, on the surface of the base plate, on which the microrobot is moved.

In the above case, it is preferable that a robot position detection means be provided which monitors the intensity of the ultrasonic waves near the surface of the base plate, on which the microrobot is moved, to detect the position of the microrobot based on the fact that the intensity of the ultrasonic waves changes depending upon the position of the microrobot.

The above guiding apparatus can be used as, for example, a measuring apparatus. In that case, measuring positions to be detected by sensors of the microrobot are included in the passage for the microrobot.

The guiding apparatus can be also used as an element conveyance apparatus. In that case, the passage for the microrobot is provided with a first element sending/receiving area in which the microrobot receives the element and a second element sending/receiving area in which the microrobot sends, at a predetermined position, the element received by the microrobot in the first element sending/receiving area.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a side view which illustrates a microrobot;

FIG. 2 is a plan view which illustrates the microrobot shown in FIG. 1;

FIG. 3 is a bottom view which illustrates the microrobot shown in FIG. 1;

FIG. 4 is a block diagram which illustrates the function of a microcomputer control unit of a circuit portion of the microrobot shown in FIG. 1;

FIG. 5 is a circuit diagram which illustrates sensors for the microrobot shown in FIG. 1;

FIG. 6 is a plan view which illustrates a drive unit for the microrobot shown in FIG. 1;

FIG. 7 is a cross-sectional view which illustrates the drive unit shown in FIG. 6;

FIG. 8 is a timing chart for explaining the basic function of the microrobot shown in FIG. 1;

FIG. 9 is a schematic view which illustrates an apparatus for guiding a microrobot according to a first embodiment of the present invention;

FIG. 10 is a schematic view which illustrates an apparatus for guiding a microrobot according to a second embodiment of the present invention;

FIG. 11 is a schematic view which illustrates an apparatus for guiding a microrobot according to a third embodiment of the present invention;

FIG. 12 is a schematic view which illustrates an apparatus for guiding a microrobot according to a fourth embodiment of the present invention;

FIG. 13 is a schematic view which illustrates an application of the apparatus for guiding a microrobot according to the fourth embodiment of the present invention;

FIG. 14 is a schematic view which illustrates an apparatus for guiding a microrobot according to a fifth embodiment of the present invention;

FIG. 15 is a schematic view which illustrates an apparatus for guiding a microrobot according to a sixth embodiment of the present invention;

FIG. 16 is schematic view which illustrates an apparatus for guiding a microrobot according to a seventh embodiment of the present invention;

FIG. 17 is a schematic view which illustrates an apparatus for guiding a microrobot according to an eighth embodiment of the present invention;

FIG. 18 is a side view which illustrates the apparatus for guiding a microrobot shown in FIG. 17;

FIG. 19 is a schematic view which illustrates an apparatus for guiding a microrobot according to a ninth embodiment of the present invention;

FIG. 20 is a schematic view which illustrates an apparatus for guiding a microrobot according to a tenth embodiment of the present invention;

FIG. 21 is a schematic view which illustrates an apparatus for guiding a microrobot according to an eleventh embodiment of the present invention;

FIG. 22 is a plan view which illustrates an operation area allowed by an apparatus for guiding a microrobot according to a twelfth embodiment of the present invention;

FIG. 23 is a flow chart showing a charging operation to be performed in the operation area for the microrobot shown in FIG. 22;

FIG. 24 is a schematic view which illustrates an operation of guiding the microrobot shown in FIG. 22 to a charging position in the operation area;

FIG. 25 is a side view which illustrates a charging mechanism disposed in the operation area for the microrobot shown in FIG. 22;

FIG. 26 is a front view which illustrates the charging mechanism shown in FIG. 25;

FIG. 27 is a plan view which illustrates the charging mechanism shown in FIG. 25;

FIG. 28 is a schematic view which illustrates an apparatus for guiding a microrobot according to a thirteenth embodiment of the present invention;

FIG. 29 is a schematic view which illustrates an apparatus for guiding a microrobot according to a fourteenth embodiment of the present invention;

FIG. 30 is a schematic view which illustrates an apparatus for guiding a microrobot according to a fifteenth embodiment of the present invention; and FIG. 31 is a schematic view which illustrates an apparatus for guiding a microrobot according to a sixteenth embodiment of the present invention.

DESCRIPTION OF THE PREFERRED EMBODIMENTS

First Embodiment

Structure of Microrobot

The structure of a microrobot according to this embodiment will now be described. In the following descriptions, elements disposed on the two sides of the microrobot and forming a pair are classified into right hand elements and left hand elements. The right hand elements are positioned to the right when viewed forwards from the microrobot and each of the elements is given symbol "R". The left hand elements are positioned to the left and each of them is given symbol "L".

FIG. 1 is a side view of the microrobot, and FIG. 2 is a plan view of the same. A microrobot 100 has a robot body 110 which has a volume of about 1 cm$^3$. Robot body 110 has a front surface portion 101 that has, thereon, sensors 111R and 111L (detection means) formed in a pair. In this embodiment, sensors 111R and 111L are optical sensors, such as photo diodes or photo transistors. Sensor 111L has a visual field A1 as a region to be detected, while sensor 111R has a visual field A2 as a region to be detected. Sensors 111R and 111L have a visual field A3 in which the visual fields A1 and A2 overlap with each other. Therefore, both sensors 111R and 111L can detect the light if the light emitted by a light source is included in the front portion, i.e., in the visual field A3.

FIG. 3 is a bottom view of microrobot 100. Microrobot 100 has, in the central portion of its bottom, a battery power source 116. Battery power source 116 comprises an electrical double layer capacitor or nickel-cadmium battery. Battery power source 116 serves as the power source for microrobot 100. Robot body 110 has antenna-like lead terminals 112 and a tail-like lead terminal 113 longitudinally projecting from the body. Lead terminals 112 and 113 serve as electrode terminals when power is charged into battery power source 116.

A circuit portion 122 is disposed on the right of battery power source 116. Circuit portion 122 comprises a circuit substrate 123 on which a microcomputer control unit 124 (a CPU-IC), a pulling-down chip resistor 117, etc. are mounted.

Drive units 115R and 115L are disposed on the two sides of circuit portion 122 and battery power source 116. Each of drive units 115R and 115L includes a step motor and a decelerating mechanism to rotate wheels 114R and 114L attached to output shafts 118R and 118L under control of the circuit portion 122. The outer surface of each of wheels 114R and 114L is made of rubber.

Note that battery power source 116, circuit portion 122 and drive units 115R and 115L are, in their front and rear portions, supported by a frame 130 through spacers 139. Battery power source 116 and circuit portion 122 respectively are placed in relatively wide areas but the total volume of microrobot 100 is reduced. Thus, capacitors and batteries each having a small internal resistance can be mounted on battery power source 116. Therefore, a large electrical current can be obtained. Furthermore, a large-size IC chip having complicated functions can be mounted on circuit portion 122.

FIG. 4 is a block diagram which illustrates the function of microcomputer control unit 124 of circuit portion 122. A CPU core 140 is composed of an ALU, a variety of registers and so forth. A ROM 142 storing a program, an address decoder 144 for ROM 142, a RAM 146 storing a variety of data items, and an address decoder 148 for RAM 146 are connected to CPU core 140. Oscillation signals generated by an oscillation unit 152 having a quartz oscillator 150 as an oscillation source are supplied to CPU core 140 as clock signals. An input/output control circuit 154 is arranged to receive the results of the detection operations performed by sensors 111R and 111L, and the results are transmitted to CPU core 140. A voltage adjuster 156 lowers and stabilizes the voltage of battery power source 116 to supply the voltage to circuit portion 122. A motor drive control circuit 158 transmits and receives signals to and from CPU core 140 to control step motors 119R and 119L through motor drive circuits 160 and 162. Step motor 119R is included in drive unit 115R, while step motor 119L is included in drive unit 115L.

FIG. 5 is a circuit diagram for use in sensor 111L. The sensor 111L comprises a photo transistor 109L. A pull-down resistor 128 is, in series, connected to the emitter terminal of photo transistor 109L to enable an output representing received light to be taken from the emitter terminal of photo transistor 109L. The waveform of the output representing the received light is shaped by the input/output control circuit 154 shown in FIG. 4, and then the output representing the received light is supplied to CPU core 140. Sensor 111R has the same structure as that of sensor 111L.

FIG. 6 is a plan view of drive unit 115L, and FIG. 7 is a cross-sectional view of the drive unit. Referring to FIGS. 6 and 7, a step motor 164 is an electromagnetic bipolar step motor for use in an electronic clock and includes an exciting coil 168 and a rotor 170 which has a magnet. Rotor 170 drives pinion 172. Pinion 172 drives pinion 174 through a gear. Pinion 174 drives a pinion 176 through a gear. Pinion 176 thus decelerates rotation of wheel 114L. Drive unit 115R has the same structure as that of drive unit 115L.

FIG. 8 is a timing chart showing the basic operation of microrobot 100. Referring to FIGS. 8 (a) and 8 (c), the output from each of sensors 111R and 111L is 0 V in period S0 in which no light is made incident upon sensors 111R and 111L. If light is made incident upon sensors 111R and 111L, voltage corresponding to the quantity of light is transmitted from each of sensors 111R and 111L. The waveform of the voltage is shaped with a predetermined threshold voltage level in input/output control circuit 154, as shown in FIG. 8 (b) and received by CPU core 140. Motor drive control circuit 158, through motor drive circuits 160 and 162, alternately forwards or reversibly supplies drive pulses to step motors 119R and 119L, as shown in FIGS. 8 (f) and 8 (g). Therefore, step motor 119R is rotated in period S1 in which sensor 111L receives light so that wheel 114R is rotated. On the other hand, in period S2 in which sensor 111R receives light as shown in FIG. 8 (c), step motor 119L is rotated as shown in FIG. 8 (g) so that wheel 114L is rotated. Both step motors 119R and 119L are rotated and wheels 114R and 114L are rotated in period W in which both sensors 111R and 111L receive light.

Referring to FIG. 2, if light emitted by the light source is passing through a portion of the visual field A1 excluding visual field A3, sensor 111L receives light. Thus, step motor 164 rotates wheel 114R in accordance with the output from sensor 111L which has received light. Since wheel 114L is stopped at this time, robot body 110 is caused to turn to the left. If light emitted by the light source is present in visual field A2 excluding visual field A3, sensor 111R receives it and step motor 119L rotates wheel 114L in accordance with output from sensor 111R which has received light. Since wheel 114R is stopped at this time, robot body 110 is turned to the right.

If light emitted from the light source is present in visual field A3, sensors 111R and 111L receive light and thus step motors 119R and 119L rotate wheels 114R and 114R in accordance with the outputs from sensors 111R and 111L which have received light. As a result, robot body 110 moves straight toward the light source.

Structure of Apparatus for Guiding Microrobot

FIG. 9 is a schematic view of an apparatus for guiding the microrobot structured as described above.

The guiding apparatus according to this embodiment has a light source 2 below (on the reverse side of) base plate 1. Pattern mask 3, including light transmissible portion 30 having predetermined pattern 5, is disposed between light source 2 and base plate 1. Thus, base plate 1 can be irradiated with light which corresponds to pattern 5 of light transmissible portion 30. Base plate 1 is made of a light transmissible material, such as plastic or glass, or a light accumulative material, a portion of which emits light for a certain time after it has been irradiated with light. Therefore, a passage 4 for microrobot 100, which is brighter than other portions, is projected onto the upper surface of base plate 1 (surface 10 on which microrobot 100 is moved). That is, this embodiment has an arrangement in which a pattern including bright and dark portions is formed by a projecting apparatus (a passage forming means) comprising light source 2 and pattern mask 3.

Thus, when passage 4, which is brighter than the other portions, is projected onto base plate 1 with light transmitted through light transmissible portion 30 of pattern mask 3, microrobot 100 placed on base plate 1 detects light of passage 4 by means of pair of sensors 111R and 111L that correspond to the eyes so that microrobot 100 is moved along passage 4.

As described above, microrobot 100 has sensors 111R and 111L that have visual fields A1 and A2 as the detection regions, visual fields A1 and A2 each including visual field A3 in which visual fields A1 and A2 overlap with each other. In microrobot 100, lead terminals 112 and 113 for charging electric power to the battery also serve as balancers. Also, wheels 114R and 114L can be individually rotated, and drive units 115R and 115L have decelerating units for corresponding wheels 114R and 114L. Battery power source 116 and microcomputer control unit 124 are also included in microrobot 100. Thus, microrobot 100 is enabled to face a direction in which the bright portion is positioned in visual field A3. Thus, if sensor 111L detects light in the left visual field A1 excluding visual field A3, light is converted into an electric pulse signal. The electric pulse signal operates only right drive unit 115R. At this time, operation of the left drive unit 115L is stopped. The result is that only right wheel 114R is rotated and left wheel 114L is stopped. Therefore, microrobot 100 turns to the left.

In accordance with the same principle, microrobot 100 turns to the right if sensor 111R detects light in right visual field A2, excluding visual field A3. If sensors 111R and 111L detect light in central visual field A3, microrobot 100 moves straight ahead. As described above, microrobot 100 moves while turning its direction to always detect light from central visual field A3.

As a result, microrobot 100 moves straight ahead on the straight portion of passage 4, shown in FIG. 9. Since sensor 111L detects leftward light at a position near first corner 4a, microrobot 100 turns to the left to move along first corner 4a. Similarly, microrobot 100 also turns to the left along a second corner 4b. Then, microrobot 100 turns to the right along third corner 4c so that it circulates along passage 4.

As described above, in this embodiment passage 4 is formed by projecting a pattern including bright and dark portions of light, which is a physical quantity generated by the projecting apparatus (including light source 2 and pattern mask 3). Therefore, the guiding operation of microrobot 100 is automatically performed without an operator. Since passage 4 formed on surface 10 is a pattern composed of light that can be varied, only the change of pattern mask 3 allows an arbitrary pattern of passage 4 to be formed on surface 10 of base plate 1. As a result, the area, on which microrobot 100 can be moved, can be widened or changed arbitrarily. In this embodiment, the distance from light source 2 to base plate 1 may be changed to enlarge or contract passage 4.

In a case where pattern mask 3 is formed into a rotary type mask which has a plurality of patterns, passage 4 can further be easily changed by switching pattern mask 3. By directly connecting an optical means, such as a mirror or a lens, to base plate 1 or by separating the same from base plate 1, limitations of the position of light source 2 and the like can be removed.

A robot position detection means may be employed so that the intensity of light is detected at a position near surface 10 of base plate 1. The position of microrobot 100 is detected in accordance with the result of the detection which is changed depending upon the position of microrobot 100. In this case, microrobot 100 can be guided while its position is being monitored.

Second Embodiment

In each of the embodiments to be described below, the guiding apparatus and the microrobot respectively have the same basic structures. Therefore, common elements are given the same reference numerals and are omitted from description.

FIG. 10 is a schematic view which illustrates a second embodiment of the present invention. A guiding apparatus according to this embodiment also comprises: light source 2 disposed below light transmissible base plate 1; and pattern mask 3 including light transmissible portion 30 having predetermined pattern 5. Pattern mask 3 is disposed between light source 2 and base plate 1. Therefore, base plate 1 is irradiated with light which corresponds to pattern 5 of light transmissible portion 30. Thus, passage 4 for microrobot 100 is formed on surface 10 of base plate 1, on which microrobot 100 is moved. Passage 4 is brighter than the other portions.

In this embodiment, diffusion plate 6 (an optical system) having a characteristic of diffusing light is disposed between base plate 1 and pattern mask 3 so that light R1, which has transmitted through base plate 1, is projected to surface 10 of base plate 1 and is diffused. Thus, the width of passage 4 is wider than that of light transmissible portion 30. Therefore, microrobot 100 is allowed to have a wide responding range because microrobot 100 surely responds to light R1 even if microrobot 100 is deviated from central line of the passage 4.

In other words, width W2 of light R2 that transmits through base plate 1 as designated by dashed lines is shown in FIG. 10 if diffusion plate 6 is not provided. If diffusion plate 6 is provided, light transmitted through diffusion plate 6 can be diffused so that width W1 on surface 10 of base plate 1 is enlarged. Thus, light R1 reaches sensors 111R and 111L of microrobot 100 even microrobot 100 is deviated from the central line of passage 4. As a result, microrobot 100 can reliably respond to light R1 at the time of movement. Note that the vertical positional relationship between diffusion plate 6 and pattern mask 3 may be inverted.

Third Embodiment

FIG. 11 is a schematic view which illustrates a third embodiment of the present invention.

This embodiment also comprises passage 4 for microrobot 100 that is formed on surface 10 of base plate 1 by using the projecting apparatus having light source 2 and pattern mask 3. Furthermore, reflecting plate 7 (an optical system) is used to guide light emitted from light source 2 to widen the width of transmitted light (the width of passage 4). In other words, if reflecting plate 7 is not used, width of the passage 4 is limited to width W3 which corresponds to transmitted light R3. If reflecting plate 7 is used, light reflected by reflecting plate 7 reaches the rear surface of pattern mask 3. Thus, wide width W4 of passage 4 can be formed which corresponds to a portion obtained by adding transmitted light R3 that is not reflected by reflecting plate 7 and transmitted light R4 reflected by reflecting plate 7. Thus, passage 4 has a wide width W4. As a result, an effect similar to that in the second embodiment can be obtained.

Fourth Embodiment

A guiding apparatus according to this embodiment comprises a base plate 1 which is a circuit board having a variety of electronic elements mounted thereon as shown in FIG. 12. The circuit board has no light transmissibility. Accordingly, a projecting apparatus (a passage forming means) comprising light source 2 and pattern mask 3 disposed above base plate 1 is used to form passage 4 for microrobot 100 on surface 10 of base plate 1. Thus, microrobot 100 is moved on circuit board through electronic elements 19. If a temperature sensor or the like is mounted on microrobot 100, the temperature distribution (the quantity of state) on the circuit board can be measured at a variety of measuring points provided in passage 4. That is, a measuring unit having an apparatus for guiding microrobot 100 mounted thereon can be constituted. In this case, the temperature distribution on the circuit board can be measured when electric elements 19 are being operated. Therefore, it is very convenient to collect data for designing the electronic elements. Also this embodiment can easily change passage 4 by only changing pattern mask 3 to a pattern mask 3A including a light transmissible portion 30A having a large-size pattern.

By forming passage 4 on base plate 1 as shown in FIG. 13 for moving microrobot 100 along passage 4, an element 13 to be assembled into a precise unit 12, such as a watch, may be transported. In other words, microrobot 100 has arms 103 for holding the element, and a parts feeder 14 for supplying elements 13 is attached to one end of base plate 1. Passage 4 is formed between parts feeder 14 and precise unit 12 through pattern mask 3 by irradiating base plate 1 with light emitted by light source 2. Thus, microrobot 100 receives the element from parts feeder 14 in a first area 4A (a first position at which the element is sent and received) and moves along passage 4 to a second area 4B (a second position at which the element is sent and received) at which element 13 is mounted on precise unit 12. Then, microrobot 100 automatically returns to first area 4A. Thus, an element conveyance unit having the apparatus for guiding microrobot 100 can be constituted. In the above case, a plurality of pairs each including passage 4 and parts feeder 14 may be provided for base plate 1 to perform the assembling operation by a plurality of microrobots 100.

The measuring unit or the conveyance unit having the guiding apparatus according to this embodiment comprises a robot position detection means which detects the intensity of light (which is a physical quantity) near surface 10 of base plate 1 to detect the present position of microrobot 100 based on the fact that the result of the detection changes depending upon the position of microrobot 100. Thus, microrobot 100 is caused to perform the operation while the present position of microrobot 100 is monitored.

Fifth Embodiment

FIG. 14 is a schematic view which illustrates a fifth embodiment of the present invention.

In order to form passage 4 for microrobot 100 by irradiating base plate 1 from a position above base plate 1 with light emitted by light source 2, a structure may be employed which has the arrangement that a converging lens 15 (an optical system) is disposed between light source 2 and pattern mask 3; and a converging lens 16 (an optical system) is disposed between the pattern mask 3 and the base plate 1. Thus, pattern 5 of light transmissible portion 30 formed in pattern mask 3 is contracted to project passage 4. In this case, pattern mask 3 is required to form only light transmissible portion 30 with a large-size pattern 5. Therefore, a complicated passage 4 can preferably be formed.

Sixth Embodiment

FIG. 15 is a schematic view which illustrates a sixth embodiment of the present invention.

Passage 4 may be projected on base plate 1 while the pattern formed on a CRT 17 is contracted by using a converging lens 18 (an optical system). In this case, CRT 17 acts as a light source and has a function of defining the pattern of passage 4. Thus, the pattern of passage 4 can easily be changed by switching only the image formed on CRT 17. Also in this case, a large pattern is required to be displayed on CRT 17. Therefore, a complicated passage 4 can preferably be formed.

Seventh Embodiment

FIG. 16 is a schematic view which illustrates a seventh embodiment of the present invention.

In this embodiment, an oscillating spot light 8 (a light source) is disposed above base plate 1 to form the passage for microrobot 100. A spot light drive unit (not shown) is used to oscillate spot light 8 longitudinally or horizontally in accordance with the direction in which the microrobot 100 is moved. Thus the position irradiated with light is changed so that microrobot 100 is guided. Also in this case, the passage can easily be changed by oscillating only spot light 8. The guidance may be performed by a scanning operation using laser beams or the like in place of spot light 8.

Eighth Embodiment

FIG. 17 is a plan view which illustrates an eighth embodiment of the present invention, and FIG. 18 is a side view of the same.

A guiding apparatus according to this embodiment comprises a light emitting body group 90 including light emitting members 9 formed into a matrix on the reverse side of light transmissible base plate 1. Light emitting members 9 are caused to emit light in the form of a predetermined pattern in accordance with an instruction issued from a known light emitting member control means (not shown). Thus, light emitting members 9 are turned on (designated by white portions) or turned off (designated by hatched sections) to form passage 4 for microrobot 100. In other words, passage 4 in the form of the pattern of light emitted by light emitting members 9 appears when light emitting members 9 that are emitting light are connected sequentially. Reference numeral 11 represents a circuit board (for example, a pin board) for light emitting members 9. Light emitting members 9 comprise miniature lamps, light emitting diodes (LEDs), infrared ray lamps or the like. Therefore, when light emitting members 9 are turned on or off, passage 4 can easily be formed into an arbitrary pattern and the same can easily be changed.

A light diffusing plate or the like may be disposed between light emitting member group 90 and base plate 1 to diffuse light emitted by light emitting members 9 to project a wide passage 4 on surface 10, on which microrobot 100 is moved.

Base plate 1 may be constituted by a liquid crystal display unit (not shown). In this case, by connecting the liquid crystal display unit to a personal computer, an arbitrary passage can easily be formed. Furthermore, surface 10 can be formed into a flat shape because the liquid crystal display unit is a flat panel. Therefore, the liquid crystal display unit is preferable for forming passage 4. Base plate 1 may be formed by a CRT or a liquid crystal display unit.

Ninth Embodiment

FIG. 19 is a schematic view which illustrates a ninth embodiment of the present invention and shows a method of detecting the position of the microrobot.

A guiding apparatus according to this embodiment comprises a plurality of LEDs (Light Emitting Devices) 21 and photosensors (light receiving members) 22 disposed on the lower side of light transmissible base plate 1 to form a matrix. LEDs 21 are caused to emit light in a predetermined pattern (the LEDs 21 that are emitting light are provided with diagonal lines) in accordance with an instruction issued from a known light emitting member control means (not shown). Thus, an arbitrary passage 4 similar to that formed in the eighth embodiment can easily be formed. Photosensors 22 disposed near LEDs 21 detect position of microrobot 100. In other words, light emitted by an LED 21 positioned below microrobot 100 reaches the microrobot and is reflected by the bottom surface of the microrobot. When reflected light R5 reaches a near photosensor 22, the photosensor 22 is turned on. Therefore, the detection of the turned-on photosensor 22 enables the position of microrobot 100 to be detected.

Tenth Embodiment

FIG. 20 is a circuit diagram which illustrates a tenth embodiment of the present invention.

A guiding apparatus according to this embodiment has an arrangement that LEDs 21 of the same type are used to emit light and to detect the position of microrobot 100. When switches (light emitting body control means) are switched to contacts a, electric currents flow from a light emission power source 24 so that LEDs 21 emit light. As a result, a portion of a plurality of LEDs 21 that emit light form passage 4. When switches 23 are switched to contacts b, LEDs 21 do not emit light. If microrobot 100 is moved to LED 21 which is emitting light, light reflected by microrobot 100 reaches a near LED 21 which is not emitting light as in the ninth embodiment. Thus, the LED 21, that is not emitting light, is brought to an electrically conductive state due to light excitation. As a result, a small electric current starts flowing from a detecting power source 25. Since a resistor 26 is connected to each of contacts b, electromotive force is generated at each of the two ends of resistor 26. Thus, the position of microrobot 100 can be detected by monitoring the electromotive force at each of the two ends of resistors 26 and by detecting an LEDs 21 which have received light.

Eleventh Embodiment

FIG. 21 is a schematic view which illustrates an eleventh embodiment of the present invention.

A guiding apparatus according to this embodiment has LEDs 21 disposed in the form of a lattice below light transmissible base plate 1 so that a lamp array 61 is constituted. The position of microrobot 100 on base plate 1 is monitored by a TV camera 68. An image taken by TV camera 68 is transmitted by means of wireless or through a wire so as to be displayed on a monitor 62 of a control unit 60. A control panel 63 of control unit 60 has control switches 64 which correspond to LEDs 21 of lamp array 61. Control switches 64 are disposed in the same configuration as that of LEDs 21 of lamp array 61. Therefore, when desired control switches 64 are depressed, control switches 64 emit light and the corresponding LEDs 21 emit light. Thus, passage 4 for microrobot 100 is projected on the surface 10 of base plate 1 by LEDs 21 which are emitting light. Furthermore, the position of passage 4 can be monitored in accordance with the state of light emission from control switches 64.

In a case where the above passage forming apparatus is employed, passage 4 can easily be changed by remote control while monitoring base plate 1 and in accordance with the monitored state. Therefore, the above structure is suitable for performing a hazardous operation, such as an experiment for synthesizing a novel chemical compound or a space operation.

Twelfth Embodiment

FIG. 22 is a schematic view which illustrates a method of charging electric power into the microrobot according to twelfth embodiment of the present invention.

A guiding apparatus according to this embodiment includes a charging position 41 in an operation area 40 for microrobot 100. A guiding lamp 42 is disposed at charging position 41. Thus, when microrobot 100 has been moved to a guided range (a guided area) 43, guiding lamp 42 is turned on so that microrobot 100 is guided to charging position 41. A charging unit to be described later is disposed at charging position 41.

FIG. 23 is a flow chart showing the operation for charging electric power into the microrobot.

If microrobot 100 must be charged, the position of microrobot 100 is detected by the robot position detection apparatus according to the ninth embodiment or the tenth embodiment or the like (step S1). Then, a discrimination is made whether microrobot 100 is in operation area 40 outside guided area 43 or in guided area 43 (step S2). If microrobot 100 is positioned outside guided area 43, microrobot 100 is guided into guided area 43. Microrobot 100 is guided to guided area 43 as described above, and then the operation of microrobot 100 is interrupted temporarily (step S3).

Then, guiding lamp 42 is turned on (step S4), and microrobot 100 is guided to the charging position 41 (step S5). The method of guiding microrobot 100 will now be described with reference to FIG. 24. When guiding lamp 42 is turned on, a guiding lamp 42 emits light radially. As a result, microrobot 100 moves while changing its direction such that light source 44 is positioned between the two sensors 111R and 111L. Microrobot 100 is guided until it passes through the responding ranges (visual fields A1 and A2) for the two sensors 111R and 111L. Thus, microrobot 100 is guided and stopped at charging position 41.

Referring back to FIG. 23, microrobot 100 is guided to charging position 41 (step S5), and then guiding lamp 42 is turned off (step S6). Then, the charging unit is set for microrobot 100 (step S7) so that the charging operation is started (step S8). If the charging time, for example, three minutes, has passed in step S9, the charging operation is completed, and the charging unit is reset (step S10) so that microrobot 100 again starts the operation (step S11).

Therefore, electric power can be charged into microrobot 100 without requiring an operator to remove microrobot 100 from operation area 40. Thus microrobot 100 can be used continuously for a long time. The operation, interruption of the operation, restarting of the operation and the like of microrobot 100 are controlled by superposing control signals by causing light to be emitted intermittently or by changing the intensity of light.

An example of the charging unit for use in the above charging operation will now be described with reference to FIGS. 25 to 27. FIG. 25 is a side view of the charging unit when it is performing the charging operation. FIG. 26 is a front view of the same, and FIG. 27 is a plan view of the same.

Referring to FIGS. 25 to 27, charging unit 45 comprises a drive unit 46 which rotates pressing members 47 and 48 from an erected state to a laid down state to press lead terminals 112 and 113 against electrodes 51 and 52 of base plate 1 at the front and rear ends of microrobot 100 so that their connections are established. In that state, electric power can be charged into microrobot 100.

Although the twelfth embodiment employs the method of guiding microrobot 100 to the charging position by guiding lamp 42, magnetic fields or ultrasonic waves may be used to guide microrobot 100. Light, magnetism or ultrasonic waves for guiding microrobot 100, for detecting the position of the same, or guiding microrobot 100 to the charging area for use by microrobot 100 may be generated from one generation source or from individual generation sources. The devices (for example, solar cells or coils) for detecting the position and those for performing the charging operation may be used commonly. The method of charging electric power into microrobot 100 is not limited to that according to this embodiment. It might be considered to employ any one of a variety of methods. For example, a method may be employed in which a solar cell is used to charge electric power in a non-contact manner.

Thirteenth Embodiment

FIG. 28 is a schematic view which illustrates a thirteenth embodiment of the present invention.

A guiding apparatus according to this embodiment comprises a sheet magnet 20 (a magnetic field generating means) for forming passage 4 on surface 10 of base plate 1, on which microrobot 100 is moved. Sheet magnet 20 is applied to the reverse side of base plate 1. That is, passage 4 is constituted by a pattern formed by sheet magnet 20 and including strong and weak magnetism portions. In this case, the portions of microrobot 100 shown in FIGS. 1 and 2 and having the eye-like functions (the sensors 111R and 111L) are magnetic sensors. The magnetic sensors detect lines of magnetic force radiated from sheet magnet 20 to cause microrobot 100 to be moved along passage 4.

A magnetic film may be applied to the surface, on which the microrobot is moved, or the reverse surface of base plate 1. A magnetic field generating means for magnetizing or demagnetizing a portion of the magnetic film is used to form a desired passage. A plurality of magnetic heads (magnetic field generating means) may be disposed in a matrix or zigzag form below base plate 1. In this case, a desired passage can easily be formed when the magnetic heads are turned on or off.

Fourteenth Embodiment

FIG. 29 is a schematic view which illustrates a fourteenth embodiment of the present invention.

A guiding apparatus according to this embodiment has an arrangement in which transmitting magnetic heads 27 and receiving magnetic heads 28 are sequentially combined and are disposed below base plate 1. When voltage is applied from an electric power source 29 to transmitting magnetic heads 27, a magnetic field passing through base plate 1 is generated. The magnetic field generates induced electric power in the adjacent receiving magnetic head 28. The induced electric power causes an electric current to flow in receiving magnetic head 31. The electric current is rectified by a diode 32 and smoothed by a capacitor 33.

The operation of a position detection mechanism of this apparatus for guiding the microrobot will now be described. When microrobot 100 approaches a transmitting magnetic head 27, the magnetic field is disordered by microrobot 100 and the flux density passing through the receiving magnetic head 28 is changed. As a result, the voltage of a receiving circuit 31 is changed. In accordance with the change in the voltage, the receiving magnetic head 28 encountering the change in the flux density is detected so that the position of microrobot 100 is detected.

In this embodiment, the transmitting magnetic head 27 is employed as a magnetic field generating means for forming passage 4. A magnetic field generated by the transmitting magnetic head 27 can be used to guide microrobot 100 including a magnetic sensor. That is, when voltage generated by the power source 29 is applied to the transmitting magnetic head 27, a magnetic field passing through base plate 1 is generated. The intense portion of the magnetic field is used as passage 4 for microrobot 100. Passage 4 may be formed by a method of projecting light as described above. In that case, light is applied from a position above base plate 1 because the transmitting magnetic heads 27 and receiving magnetic heads 28 are disposed on the reverse side of base plate 1.

Fifteenth Embodiment

FIG. 30 is a schematic view which illustrates a fifteenth embodiment of the present invention.

A guiding apparatus according to this embodiment comprises a robot position detection means having an arrangement in which a plurality of magnetic sensors 35 are disposed on the reverse side of base plate 1. The magnetic fields generated by step motors 15R and 15L of microrobot 100 are detected by magnetic sensors 35 so that the position of microrobot 100 is detected.

The passage for microrobot 100 is formed by a method similar to that employed in the fourteenth embodiment. For example, transmitting magnetic heads are disposed among magnetic sensors 35 and the intense portions of the magnetic fields generated by the transmitting magnetic heads are used as the passage for microrobot 100. Intense light portions may be used for the passage by applying light from a position above base plate 1.

Sixteenth Embodiment

FIG. 31 is a schematic view which illustrates a sixteenth embodiment of the present invention.

An apparatus for guiding a microrobot according to this embodiment guides microrobot 100 by supplying, from an upper position, light or the like from a generation source 36 for generating light, magnetism or sound. Position detection sensors 37 disposed below base plate 1 detect the position of microrobot 100. That is, the intensity of light, magnetism or sound emitted by generation source 36 to be detected by position detection sensors 37 is changed if microrobot 100 passes through a position above a position detection sensor 37. In accordance with the result of the detection, the position of microrobot 100 is detected. Microrobot 100 may have an insulating plate 38 for insulating light, magnetism or sound generated by generation source 36. One generation source may serve as a generation source for light or the like for guiding the microrobot and for detecting the position.

Other Embodiments

If the microrobot moves in response to sound, such as ultrasonic waves, a desired passage pattern can be formed by disposing ultrasonic wave heads or the like. In other words, a pattern including intense and weak portions of the ultrasonic waves, which is a physical quantity, is formed on the surface of the base plate, on which the microrobot is moved, by using the ultrasonic wave generating apparatus. The microrobot is moved along the pattern including the intense and weak portions. In order to use this guiding method, ultrasonic wave generating means (passage forming means), such as ultrasonic wave heads, for forming a pattern including strong and weak portion of ultrasonic waves are provided for the apparatus for guiding the microrobot. The ultrasonic wave generating means is disposed on the surface of the base plate, on which the microrobot is moved. In this case, a robot position detection means may be provided which supervises the intensity of ultrasonic waves near the surface of the base plate, on which the microrobot is moved, and which detects the position of the microrobot because the intensity of the ultrasonic waves is changed in accordance with the position of the microrobot.

As an alternative to light, magnetism or sound, a detector for detecting an electric current or voltage may be provided and the passage may be formed by a pattern including changed portions of the electric current or the voltage.

As described above, a characteristic of the present invention is that the passage for the microrobot is formed on the surface of the base plate, on which the microrobot is moved, as a pattern including intense and weak portions of the physical quantity, such as light, magnetism or sound. Therefore, the present invention enables the microrobot having the detection means to move along the changed pattern of physical quantity, such as light, magnetism or sound while responding to the intense and weak portions of the physical quantity. Therefore, the operator's guiding operation is not required for automatically guiding the microrobot. By changing the pattern of the change in the physical quantity, the passage can arbitrarily be formed. Therefore, the operation area can easily be changed, enlarged or contracted. As a result, an effect can be obtained in that the microrobot can be used widely as an amusement robot or an operation robot.

By enlarging the light change pattern, which forms the passage on the surface of the base plate, the reactive range for the microrobot can be enlarged because the microrobot can move on a predetermined passage even if the microrobot has been deviated from the central position of the passage.

In a case where the robot position detection means are provided for the passage, the microrobot can be guided to a desired position or area while the position of the microrobot is monitored.

In a case where the charging area is provided on the passage, the guidance of the microrobot to the charging area enables the microrobot to be charged with electric power on the base plate. Therefore, the necessity of removing the microrobot from the base plate can be omitted whenever the charging operation is to be performed. Therefore, the microrobot can perform operation continuously.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A microrobot system, comprising:

a base plate having a surface;

means for forming a predetermined light pattern on said surface of said base plate; and a microcomputer-controlled microrobot disposed on said light pattern of said base plate and including left and right detection means mounted thereon for detecting light, said left and right detection means having left and right detection fields, respectively, said left and right detection fields partially overlapping each other to form a central detection field of said microrobot;

wherein said microrobot turns to left in response to detection of light in said left detection field and turns right in response to detection of light in said right detection field, and said microrobot moves straight ahead in response to detection of light in said central detection field.

2. The microrobot system according to claim 1, wherein said microrobot further includes:

a body on which said left and right detection means are mounted, left and right wheels mounted on a bottom portion of said body, and left and right drive means for driving said left and right wheels, respectively so that said left and right wheels are rotated independently of each other.

3. The microrobot system of claim 2 wherein said microrobot further includes a battery for supplying power, said battery being disposed on the bottom portion of said microrobot body and between said left and right drive means.

4. The microrobot system according to claim 1 further comprising robot position detection means for detecting the position of said microrobot by detecting light intensity near said surface of said base plate, said light intensity changing guiding depending upon the position of said microrobot.

5. The microrobot system according to claim 1, wherein said forming means includes means for projecting a bright and dark light pattern on said surface of said base plate so that said predetermined light pattern constitutes a bright portion of said bright and dark light pattern.

6. The microrobot system according to claim 5, wherein said base plate is made of light transmissible material, and said projecting means includes a light source irradiating light on said base plate from a side opposite to said surface of said base plate and a pattern mask disposed between said light source and said base plate, said pattern mask including a light transmissible portion having a predetermined pattern corresponding to said bright portion of said bright and dark pattern on said base plate.

7. The microrobot system according to claim 6, wherein said forming means includes optical means for diverging and for converging light emitted from said light source to change the size of said bright and dark pattern to be projected on said surface of said base plate.

8. The microrobot system according to claim 5, wherein said projecting apparatus includes a light source irradiating light on said surface of said base plate from a position above said surface of said base plate and a pattern mask disposed between said light source and said base plate, said pattern mask including a light transmissible portion having a predetermined pattern corresponding to said bright portion of said bright and dark pattern on said base plate.

9. The microrobot system according to claim 5 further comprising robot position detection means for detecting the position of said microrobot by detecting light intensity near said surface of said base plate, said light intensity changing depending upon the position of said microrobot.

10. The microrobot system according to claim 1, wherein said forming means includes a light source disposed within a predetermined range of said base plate and irradiating said surface of said base plate with light and drive means for moving a position of said light source to adjust the position of light irradiated on said surface of said base plate.

11. The microrobot system according to claim 1, wherein said base plate is made of light transmissible material and said forming means includes a group of light emitting means disposed on a side opposite to said surface of said base plate for serving as a light source and control means for causing said group of light emitting means to emit light in a predetermined pattern.

12. The microrobot system according to claim 11 further comprising robot position detection means for detecting the position of said microrobot by detecting the electromotive force of a portion of said group of light emitting means that is not emitting light, said electromotive force changing depending upon the position of said microrobot.

13. The microrobot system according to claim 11 further comprising robot position detection means having light receiving means disposed near said group of light emitting means for detecting the position of said microrobot by detecting intensity of light reflected by said microrobot, said light intensity changing in response to said light reflected by said microrobot.

14. The microrobot system according to claim 1, further comprising charging means, disposed on an area of said predetermined light pattern for charging electric power into said microrobot.

15. The microrobot system of claim 1 wherein said microrobot includes a sensor which collects predetermined type of data from said base plate.

16. The microrobot system of claim 1
wherein said predetermined light pattern includes a first area at which said microrobot receives an object from an external apparatus and a second area at which said microrobot, at a predetermined position, delivers said object which has been received by said microrobot at said first area.

17. A microrobot system, comprising:

a base plate having a surface;

magnetic field generating means for forming an intense and weak magnetism pattern on said surface of said base plate; and a microcomputer-controlled microrobot disposed on said magnetism pattern of said base plate and including left and right detection means mounted thereon for detecting magnetic flux, said left and right detection means having left and right detection fields, respectively, said left and right detection fields partially overlapping each other to form a central detection field of said microrobot;

wherein said microrobot turns to left in response to detection of magnetic flux in said left detection field and turns right in response to detection of magnetic flux in said right detection field, and said microrobot moves straight ahead in response to detection of magnetic flux in said central detection field.

18. The microrobot system according to claim 17 further comprising robot position detection means for detecting the position of said microrobot by monitoring a magnetic flux density near said surface of said base plate, said magnetic flux density changing depending upon the position of said microrobot.

19. The microrobot system according to claim 17 wherein said microrobot further includes:

a body on which said left and right detection means are mounted, left and right wheels mounted on a bottom portion of said body, and left and right drive means for driving said left and right wheels, respectively so that said left and right wheels are rotated independently of each other.

20. A microrobot system, comprising:

a base plate having a surface;

ultrasonic wave generating means for forming an intense and weak ultrasonic wave pattern on said surface of said base plate; and a microcomputer-controlled microrobot disposed on said ultrasonic wave pattern of said base plate and including left and right detection means mounted thereon for detecting ultrasonic wave, said left and right detection means having left and right detection fields, respectively, said left and right detection fields partially overlapping each other to form a central detection field of said microrobot;

wherein said microrobot turns to left in response to detection of ultrasonic wave in said left detection field and turns right in response to detection of ultrasonic wave in said right detection field, and said microrobot moves straight ahead in response to detection of ultrasonic wave in said central detection field.

21. The microrobot system according to claim 20 further comprising robot position detection means for detecting the position of said microrobot by monitoring the intensity of said ultrasonic waves near said surface of said base plate, the intensity of said ultrasonic waves changing depending upon the position of said microrobot.

22. The microrobot system according to claim 20 wherein said microrobot further includes:

a body on which said left and right detection means are mounted, left and right wheels mounted on a bottom portion of said body, and left and right drive means for driving said left and right wheels, respectively so that said left and right wheels are rotated independently of each other.

\* \* \* \* \*

UNITED STATES PATENT AND TRADEMARK OFFICE
CERTIFICATE OF CORRECTION

PATENT NO.    : 5,596,255
DATED         : January 21, 1997
INVENTOR(S)   : Osamu Miyazawa It is certified that an error appears in the above identified patent and that said Letters Patent is hereb corrected as shown below:

Column 17, line 13, delete "guiding".

Signed and Sealed this

Eighth Day of April, 1997

*Attest:*

BRUCE LEHMAN

*Attesting Officer*    *Commissioner of Patents and Trademarks*